(12) United States Patent
Kim

(10) Patent No.: US 9,091,362 B2
(45) Date of Patent: Jul. 28, 2015

(54) AUTOMATIC GAS INTAKE AND EXHAUST VALVE DEVICE

(76) Inventor: Chung-hyo Kim, Seoul (KR)

( * ) Notice: Subject to any disclaimer, the term of this patent is extended or adjusted under 35 U.S.C. 154(b) by 240 days.

(21) Appl. No.: 13/497,278

(22) PCT Filed: Sep. 8, 2010

(86) PCT No.: PCT/KR2010/006105
§ 371 (c)(1),
(2), (4) Date: Mar. 21, 2012

(87) PCT Pub. No.: WO2011/037341
PCT Pub. Date: Mar. 31, 2011

(65) Prior Publication Data
US 2012/0205562 A1     Aug. 16, 2012

(30) Foreign Application Priority Data

Sep. 24, 2009  (KR) .................. 10-2009-0090479

(51) Int. Cl.
*F16K 24/04*    (2006.01)
*F16K 33/00*    (2006.01)
*F16L 55/07*    (2006.01)

(52) U.S. Cl.
CPC ............. *F16K 24/046* (2013.01); *F16K 33/00* (2013.01); *F16L 55/07* (2013.01)

(58) Field of Classification Search
USPC ............................................. 137/202, 15.26
See application file for complete search history.

(56) References Cited

U.S. PATENT DOCUMENTS

| | | | | |
|---|---|---|---|---|
| 3,695,010 | A * | 10/1972 | Barrett | 55/385.4 |
| 4,104,004 | A * | 8/1978 | Graef | 417/313 |
| 4,524,794 | A * | 6/1985 | Haines | 137/202 |
| 4,586,528 | A * | 5/1986 | Andres et al. | 137/202 |
| 6,016,828 | A * | 1/2000 | Machledt | 137/202 |
| 6,601,608 | B1* | 8/2003 | Graute et al. | 137/460 |
| 6,848,465 | B1* | 2/2005 | Ledbetter | 137/315.04 |
| 7,074,014 | B2* | 7/2006 | Ichinose | 417/306 |
| 2013/0319916 | A1* | 12/2013 | Hamza et al. | 210/90 |

FOREIGN PATENT DOCUMENTS

| | | |
|---|---|---|
| JP | 60-206417 A | 10/1985 |
| JP | 61-009680 U | 1/1986 |
| KR | 20-1998-0003973 U | 3/1998 |

* cited by examiner

*Primary Examiner* — William McCalister
*Assistant Examiner* — Ian Paquette
(74) *Attorney, Agent, or Firm* — Noviak, Kim & Lee, PLLC; Jae Youn Kim

(57) ABSTRACT

Disclosed is an automatic gas intake and exhaust valve device including a main body part having an orifice hole at one side and an intake and exhaust hole at an opposite side, an opening/closing member movably inserted into the main body part to open/close the intake and exhaust hole, and a coupling member extending along one side of the main body part to couple the main body part with a pipe in the communication state of the pipe. The opening/closing member floats according to a flow velocity of a fluid introduced into the main body part and discharged out of the main body part, to close the intake and exhaust hole, and drops down to the bottom of the main body part by a weight of the opening/closing member to open the intake and exhaust hole if a fluid level is lowered, thereby automatically introduce and exhaust internal air of the pipe and facilities.

9 Claims, 55 Drawing Sheets

AUTOMATIC GAS INTAKE AND EXHAUST VALVE DEVICE

BACKGROUND OF THE INVENTION

1. Field of the Invention

The present invention relates to an automatic gas intake and exhaust valve device. In more particular, the present invention relates to an automatic gas intake and exhaust valve device capable of exhausting air in a pipe and introducing external air into the pipe when a fluid flows.

2. Description of the Related Art

In general, to allow a water piping system to perform a desirable operation thereof, air or other non-condensable gas must be necessarily removed from a pipe. If air or gas is filled in the pipe, the air or the gas interrupts the flow of a fluid, so that the malfunction of available facilities may be caused, noise and vibration may be excessively generated, the pipe may be corroded or destructed, and the repair and maintenance cost may be increased.

The above problems can be solved by employing an air/vacuum valve device to control the flow of the air so that air can exhausted from the pipe and external air is introduced into the pipe The air/vacuum valve device of the related art floats a ball by a fluid, which flows in or flows out, to open or close an air exhaust hole. In this case, the ball has a specific gravity less than 1 so that the ball can float on the water. However, since the air/vacuum valve device according to the related art must be equipped with a ball floating by a fluid and a support structure to support a valve, the air/vacuum valve device has a complex structure. Accordingly, the air/vacuum valve device may not be easily manufactured and assembled, so that the productivity thereof may be degraded.

In addition, the manufacturing cost of the air/vacuum valve device may be increased due to the complex structure thereof, and the repair and maintenance work for the air/vacuum valve device may not be easily performed.

Further, since the air/vacuum valve device according to the related art has the structure which is not suitable for manufacturing an automatic gas intake and exhaust valve device having a large diameter.

SUMMARY OF THE INVENTION

Accordingly, the present invention has been made keeping in mind the above problems occurring in the prior art, and an object of the present invention is to provide an automatic gas intake and exhaust valve device, which can be provided in a simple structure and easily manufactured and maintained, and has a gas intake and exhaust hole having a large diameter.

To accomplish these objects, according to one aspect of the present invention, there is provided an automatic gas intake and exhaust valve device including a main body part provided at one side thereof with an orifice hole and provided at an opposite side thereof with an intake and exhaust hole, an opening/closing member movably inserted into the main body part in a non-constrained state to open/close the intake and exhaust hole, and a coupling member extending along the one side of the main body part to couple the main body part with a pipe so that the main body part communicates with the pipe. The opening/closing member floats according to a flow velocity of a fluid, which is introduced into the main body part from the pipe through the orifice hole and discharged out of the main body part through the intake and exhaust hole, to close the intake and exhaust hole, and drops down to a bottom of the main body part by a weight of the opening/closing member to open the intake and exhaust hole if a level of the fluid introduced into the main body part is lowered.

Preferably, a specific gravity of the opening/closing member is 1.0 to 9.0 times greater than a specific gravity of the fluid.

Preferably, the orifice hole has a width narrower than a diameter of the pipe. In addition, the orifice hole may include an elongated hole. Further, preferably, the orifice hole includes a pair of holes spaced apart from each other by a predetermined distance, and at least one of the holes is positioned corresponding to a position of the intake and exhaust hole.

The opening/closing member may have a spherical shape, and may have a diameter greater than a width of the orifice hole.

The coupling member may have a pipe shape, one side of the coupling member, which is coupled with the pipe, may be open, and an opposite side of the coupling member may be closed. Naturally, both of one side of the coupling member, which is coupled with the pipe, and an opposite side thereof are open.

The coupling member includes a contact part attached to one surface of the pipe, and a fastening band having one end coupled with both ends of the contact part and open ends detachably coupled with each other.

Preferably, the contact part extends along a peripheral portion of a side of the main body part in which the orifice hole is formed, and has a predetermined curvature so that the contact part closely makes contact with the pipe.

The main body part may be formed therein with a drawing hole for repair and maintenance work for the opening/closing member, and may include a plug for cleaning to open/close the drawing hole The coupling member may be coupled with the pipe by a screw. In addition, naturally, the coupling member and the pipe include a synthetic resin material, and are coupled with each other through an adhesive or a welding scheme. In addition, the coupling member and the pipe include a metallic material, and are coupled with each other through a welding scheme.

The coupling member may include a joint member disposed at the one side of the coupling member, which is coupled with the pipe, and the joint member includes a first part detachably coupled with one end of the coupling member by a screw, and a second part coupled with one end of the pipe by using a screw or an adhesive. In this case, a packing for air tightness is preferably provided in a contact part between the coupling member and the second part.

In addition, the coupling member includes a joint member disposed at the one side of the coupling member, which is coupled with the pipe, and the joint member includes a first part detachably coupled with one end of the coupling member by a screw, and a compression ring fitted around an outer peripheral portion of the pipe in a state that the compression ring is positioned inside the first part. The compression ring may closely make contact with the first part, the open ends of the coupling member, and the pipe if the first part is coupled with the coupling member to maintain air tightness.

The coupling member includes a first coupling part formed at a rear portion of the main body part, and a second coupling part formed at one side of the pipe. The first coupling part may be detachably and slidably coupled with the second coupling part.

Further, according to another aspect of the present invention, there is provided an automatic gas intake and exhaust valve device including an orifice hole formed in a pipe, a main body part having one side communicating with the orifice hole and an opposite side provided therein with an intake and exhaust hole, and coupled with the pipe through a welding scheme or an adhesive, and an opening/closing member movably inserted into the main body part in a non-constrained state to open/close the intake and exhaust hole. The opening/closing member floats according to a flow velocity of a fluid, which is introduced into the main body part from the pipe through the orifice hole and discharged out of the main body part through the intake and exhaust hole, to close the intake and exhaust hole, and drops down to a bottom of the main body part by a weight of the opening/closing member to open the intake and exhaust hole if a level of the fluid introduced into the main body part is lowered.

As described above, according to the present invention, since the opening/closing member is provided to open/close the intake and exhaust hole by the fluid, which is introduced into the main body part or discharged out of the main body part, the whole structure of the automatic gas intake and exhaust valve device can be simply constructed, so that the automatic gas intake and exhaust valve device can be easily manufactured and assembled. Accordingly, the productivity of the automatic gas intake and exhaust valve device can be improved.

In addition, the present invention can be easily maintained in the simple structure, and the cost of the product can be lowered.

Further, according to the present invention, since the intake and exhaust hole having a large diameter is employed in the structure, so that the intake and exhaust hole can be prevented from being clogged by sediments contained waste water when the waste water is discharged. Accordingly, the malfunction of the valve device can be previously prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
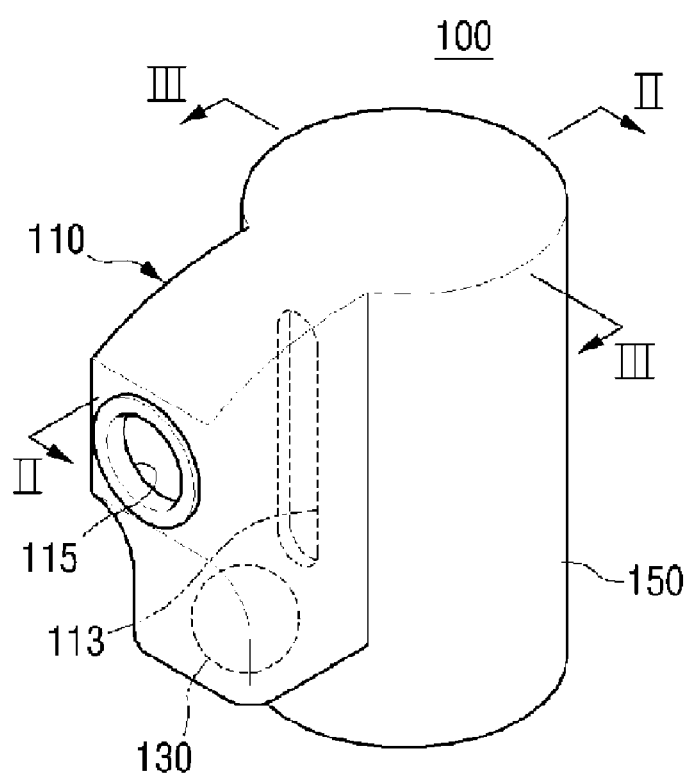
FIG. 1 is a perspective view showing an automatic gas intake and exhaust valve device according to the first embodiment of the present invention.

Referring to FIG. 1, an automatic gas intake and exhaust valve device 100 according to a first embodiment includes a main body part 110, an opening/closing member 130, and a coupling member 150.

The main body 110 is provided therein with a space part 111 into which the opening/closing member 130 is movably inserted in an unconstrained state, and provided at both sides thereof with an orifice hole 113 and a gas intake and exhaust hole 115, respectively.

Figure 2:
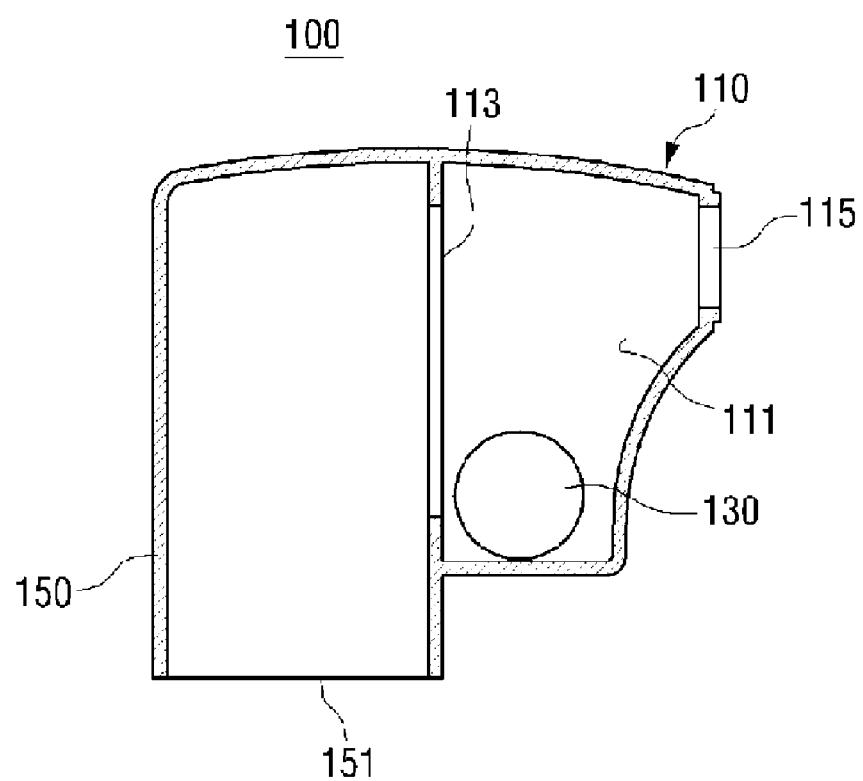
FIG. 2 is a sectional view taken along line II-II of FIG. 1.

Referring to FIG. 2, as the space part 111 is gradually widened upward, one side of the top of the main body part 110 has a protrusion shape.

Figure 3:
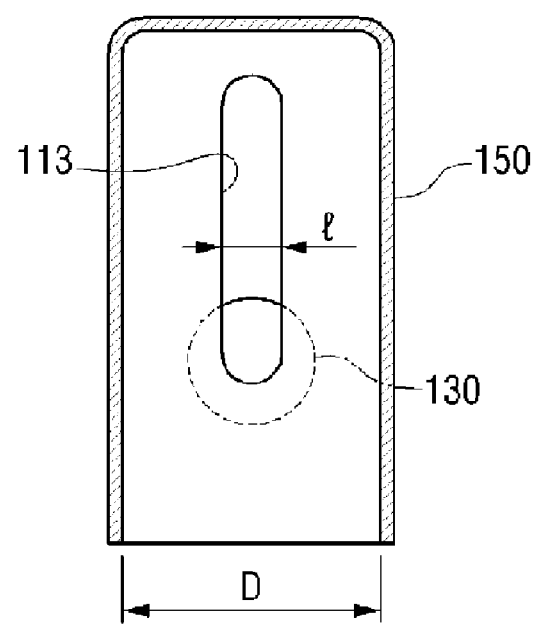
FIG. 3 is a sectional view taken along line III-III of FIG. 1.

The orifice hole 113 has a width l (see FIG. 3) narrower than a diameter D of the coupling member 150. Therefore, the flow velocity of the fluid to be introduced into the space part 111 of the main body 110 through the coupling member 150 is increased since the fluid passes through the orifice hole 113.

The gas intake and exhaust hole 115 is used to exhaust air which has been introduced into the space part 111 of the main body part 110 through the orifice hole 113 together with the fluid. In addition, the gas intake and exhaust hole 115 serves as a passage through which external air is introduced into the space part 111 of the main body part 110 when the gas intake and exhaust hole 115, which has been closed by the opening/closing member 130, is open.

The opening/closing member 130 has a spherical shape, and has a specific gravity, which is 1.0 to 9.0 times greater than that of the fluid so that the opening/closing member 130 does not float in the first stage in which the fluid is introduced. The range of the specific gravity of the opening/closing member 130 is set by taking a predetermined time interval into consideration so that the opening/closing member 130 floats to close the gas intake and exhaust hole 115 after the air in the coupling member 150 and the space part 111 of the body part 110 has been fully exhausted to the outside through the gas intake and exhaust hole 115. The opening/closing member 130 preferably includes synthetic resin, iron, or non-iron metal.

If the specific gravity of the opening/closing member 130 is less than 1.0 times the specific gravity of the fluid, the gas intake and exhaust hole 115 is closed by the opening/closing member 130 before the air in the connection member 150 and the space part 111 of the main body part 110 is completely exhausted. If the specific gravity of the opening/closing member is greater than 9.0 times the specific gravity of the fluid, the opening/closing member 130 mostly stays on the bottom of the space part 111 without floating, so that the gas intake and exhaust hole 115 may not be smoothly closed.

Regarding the opening and closing member 130, when the fluid is introduced into the space part 111 of the main body part 110 from the vessel 180 through the orifice hole 113 and discharged through the gas intake and exhaust hole 115, as the pressure on the top of the opening/closing member 130 is lowered corresponding to the flow velocity of the fluid according to Bernoulli's effect, the above opening and closing member 130 floats to close the gas intake and exhaust hole 115. In this case, the opening/closing member 130 is maintained in the closed state due to the static pressure of the fluid. In addition, if the level of the fluid introduced into the space part 111 of the main body part 110 is lowered, the opening/closing member 130 drops down to the bottom of the space part 111 of the main body part 110 due to the weight of the opening/closing member 130 to open the gas intake and exhaust hole 115.

The coupling member 150 has a substantially tube shape and extends along one side of the main body part 110 so that the main body part 110 can be communicated with the vessel 180. As described above, the coupling member 150 mutually communicates the main body part 110 with a pipe 183, so that air in the vessel 180 can be discharged to the outside or introduced from the outside. In addition, the coupling member 150 according to the first embodiment has an opening 151 (see FIG. 2) only at a side coupled with the vessel 180.

Figure 4:
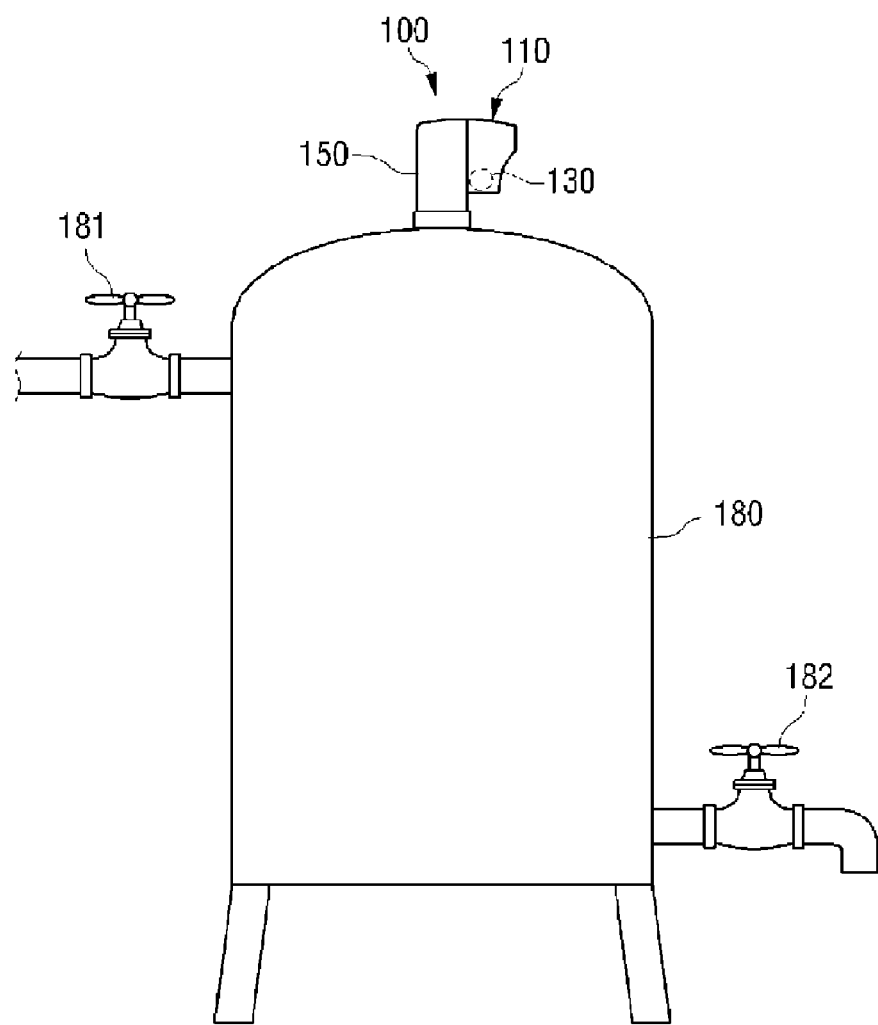
FIG. 4 is a schematic view showing the automatic gas intake and exhaust valve device according to the first embodiment of the present invention which is installed in a vessel.

As shown in FIG. 4, the automatic gas intake and exhaust valve device 100 according to the first embodiment having the above structure is coupled with an upper portion of the vessel 180 for the use, so that the internal air of the vessel 180 can be exhausted to the outside, or air can be introduced into the vessel 180.

Hereinafter, the operation of the automatic gas intake and exhaust valve device 100 mounted on the vessel 180 will be described with reference to FIGS. 4 to 8.

First, when a fluid, for example, water is filled in the vessel 180, the water is continuously supplied into the vessel 180 through an inlet valve 181 in the state that the inlet valve 181 is open and a drain valve 182 is closed. Accordingly, the water introduced into the vessel 180 is filled from the bottom surface of the vessel 180, and the internal air of the vessel 180 is gradually exhausted out of the vessel 180 through the automatic gas intake and exhaust valve device 100.

Figure 5:
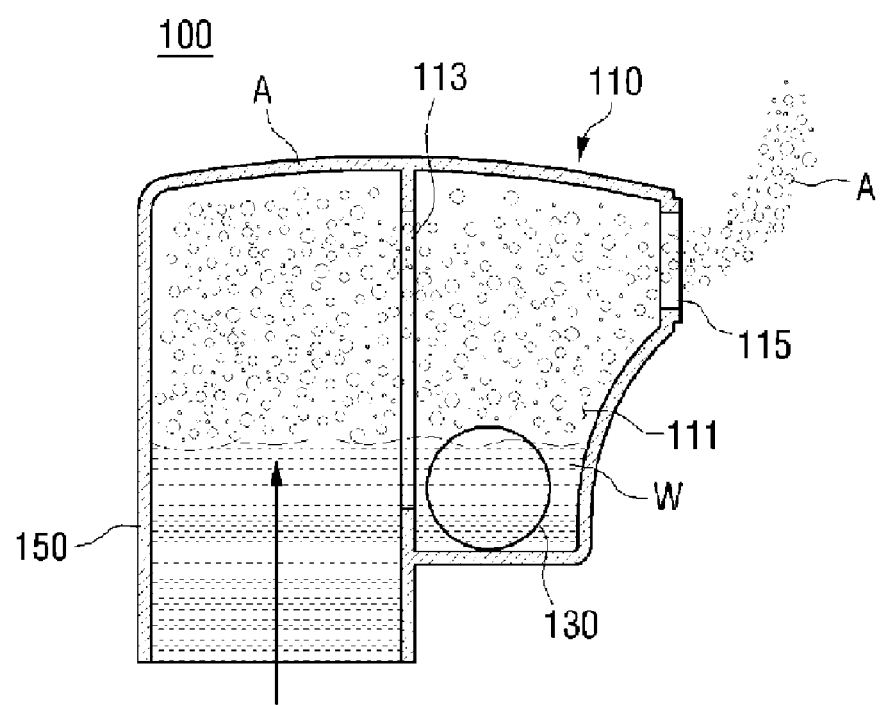
FIGS. 5 to 8 are sectional views sequentially showing the operation of the automatic gas intake and exhaust valve device according to the first embodiment of the present invention.

Next, if water W is fully filled in the vessel 180, the water W is introduced into the coupling member 150. The water W introduced into the coupling member 150 is introduced into the space part 111 of the main body part 110 through the orifice hole 113 as shown in FIG. 5. At this time, the water W is introduced into the space part 111 of the body part 110 at the flow velocity faster than the flow velocity to introduce the water W into the coupling member 150 from the vessel 180. In this case, since the opening/closing member 130 has the specific gravity greater than that of the water W, the opening/closing member 130 does not float, but remains in the sinking state.

Figure 6:
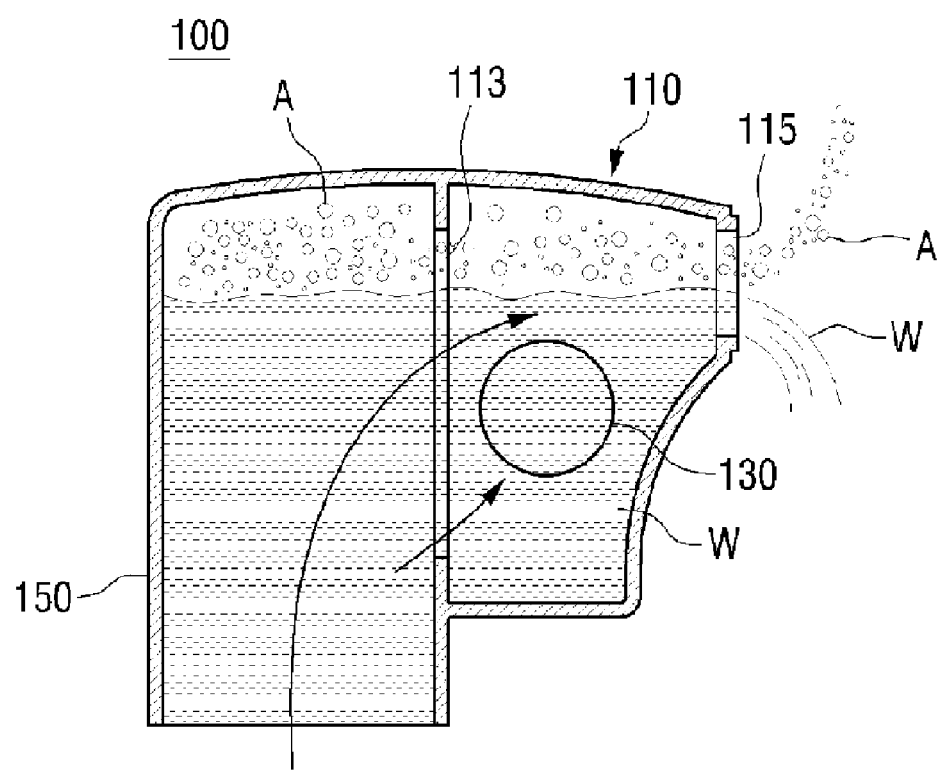
Figure 7:
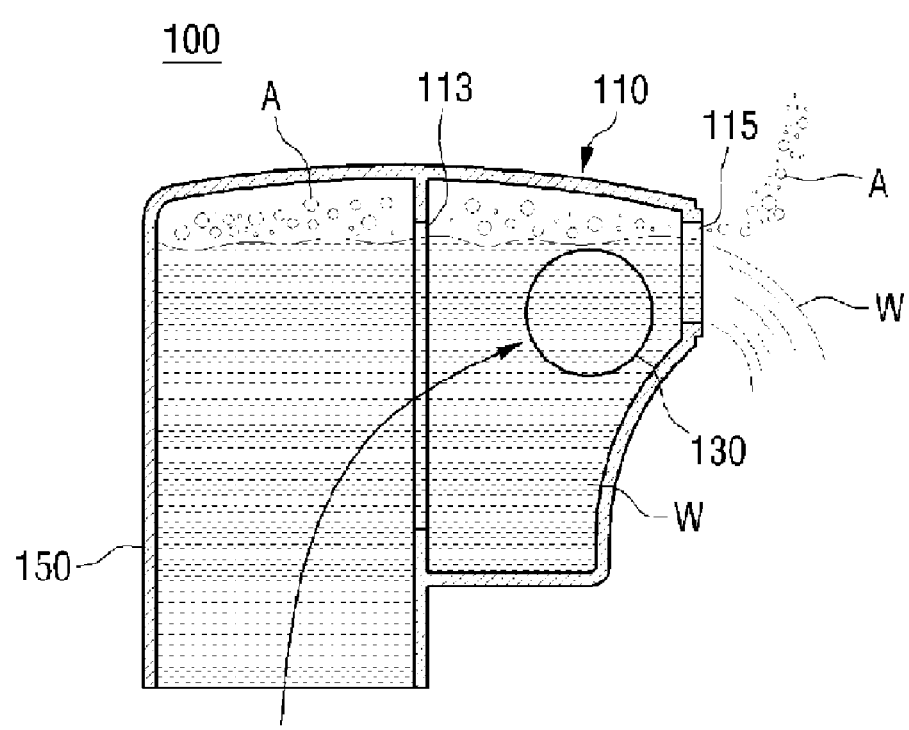

Subsequently, as shown in FIG. 6, as the water W is continuously introduced into the space part 111 of the main body part 110 through the orifice hole 113, the opening/closing member 130 is completely submerged under the water W. In this case, since the pressure on the top of the opening/closing member 130 is lowered than the pressure on the bottom of the opening/closing member 130 due to the dynamic pressure of the water W rapidly introduced through the orifice hole 113 according to the Bernoulli's effect, the opening/closing member 130 rises to move toward the gas intake and exhaust hole 115 as shown in FIG. 7. As the opening/closing member 130 rises after a predetermined time interval, the air A inside the coupling member 150 and the space part 111 of the body part 110 is fully exhausted through the gas intake and exhaust hole 115.

Figure 8:
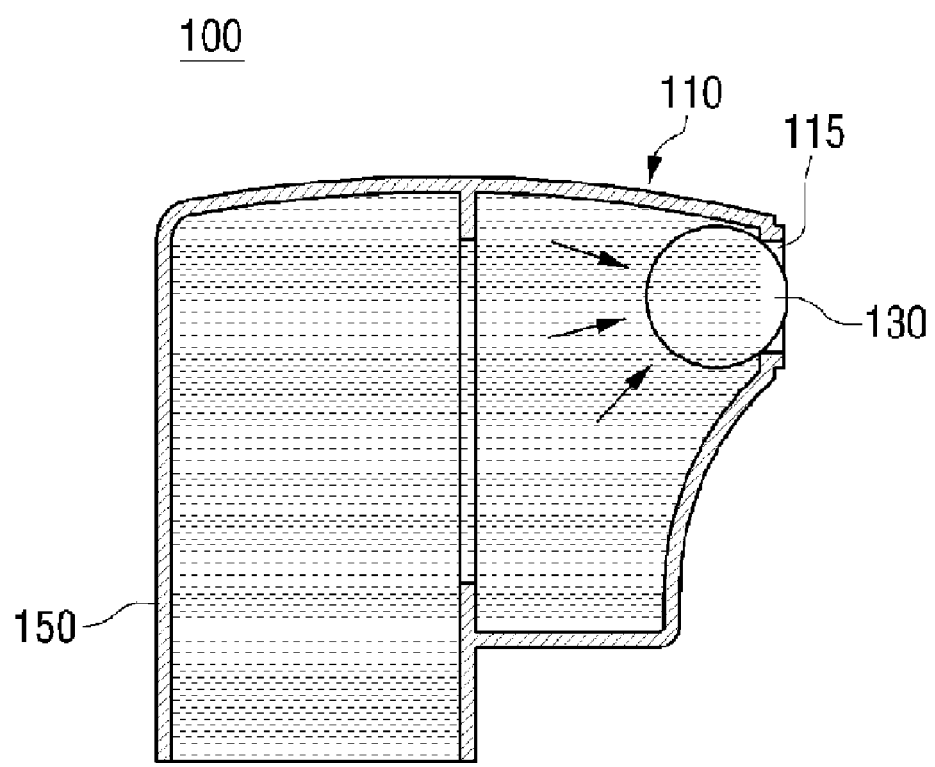

Thereafter, as shown in FIG. 8, the opening/closing member 130 completely closes the gas intake and exhaust hole 115 due to the internal static pressure of the vessel 180. As described above, the procedure of FIGS. 5 to 8 is performed in a very short time of period.

Meanwhile, when water filled in the vessel 180 is supplied to the outside, the inlet value 181 is closed, and the drain valve 182 is open. Accordingly, the water is discharged out of the vessel 180, and the level of the water filled into the automatic gas intake and exhaust valve device 100 is gradually lowered.

Therefore, the opening/closing member 130 drops down to the bottom of the space part 111 of the main body part 110 due to the weight of the opening/closing member 130 to open the gas intake and exhaust hole 115. External air is introduced through the open gas intake and exhaust hole 115 so that the inner part of the vessel 180 becomes in the atmospheric pressure state. Accordingly, the internal water of the vessel 180 is smoothly discharged through the drain valve 182. In addition, the vessel 180 may become in the vacuum state, thereby preventing that the vessel 180 from being crushed, which is called "vacuum crush".

Figure 9:
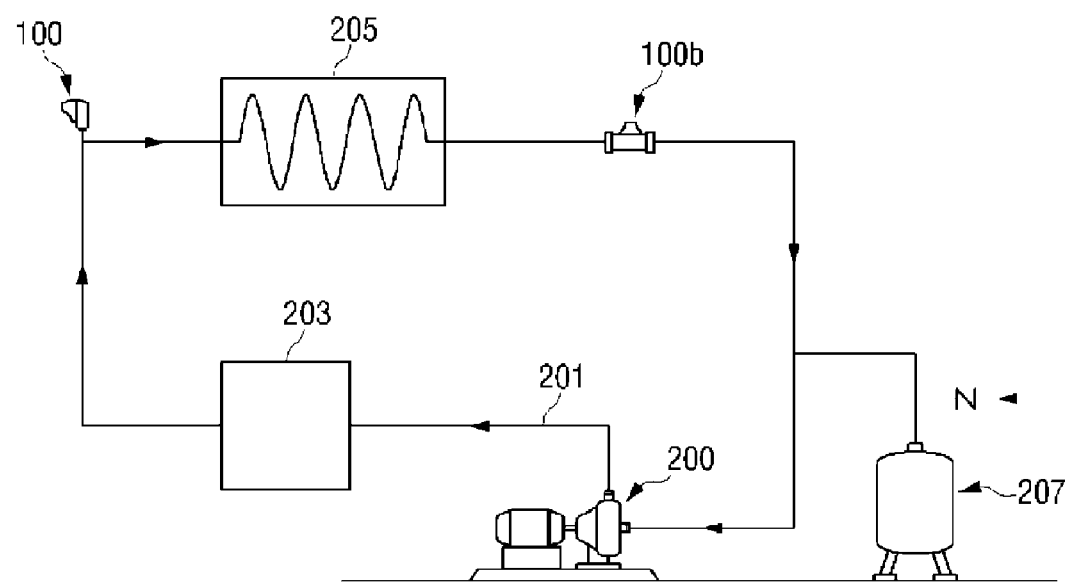
FIG. 9 is a schematic view showing the automatic gas intake and exhaust valve device according to the first embodiment of the present invention which is applied to a typical heat exchange system.
Figure 10:
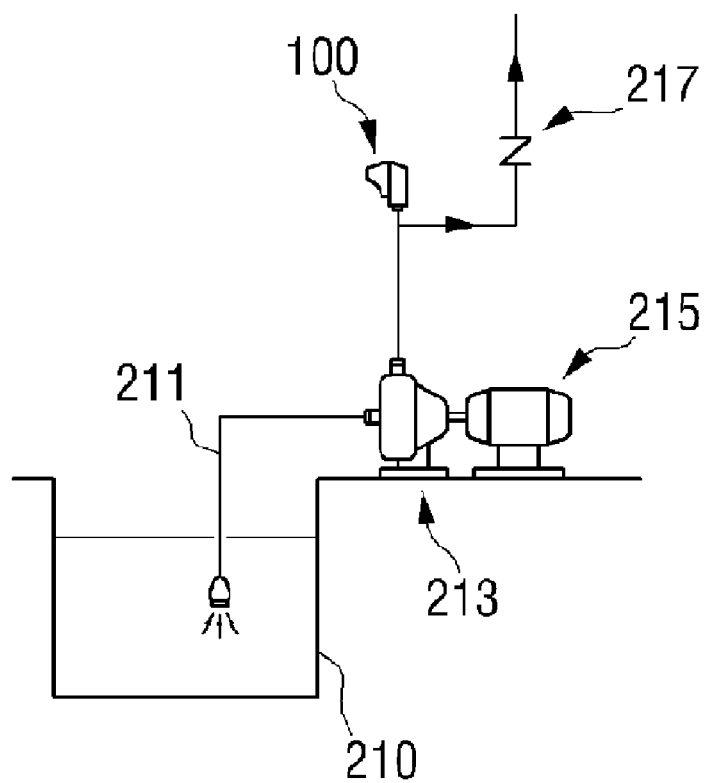
FIG. 10 is a schematic view showing the automatic gas intake and exhaust valve device according to the first embodiment of the present invention which is applied to a typical pump device.

Although the present invention has been described in that the automatic gas intake and exhaust valve device 100 according to the first embodiment is applied to the vessel 180 as shown in FIG. 4, the use range of the present invention is not limited to the vessel 180, but can be naturally applied to a typical heat exchange system as shown in FIG. 9, and applied to a typical pump device as shown in FIG. 10.

Reference numerals 200, 201, 203, 205, and 207 of FIG. 9, which are not described, represent a circulation pump, a discharge pipe, a heat source, a heat exchanger, and an expansion tank, respectively. Reference numerals 210, 211, 213, 215, and 217 of FIG. 10, which are not described, represent a water tank, a suction pipe, a pump, a motor, and a check valve for anti-reverse flow, respectively.

As shown in FIGS. 11 to 23, the automatic gas intake and exhaust valve device 100 according to the first embodiment is applicable to each part according to various embodiments.

Figure 11:
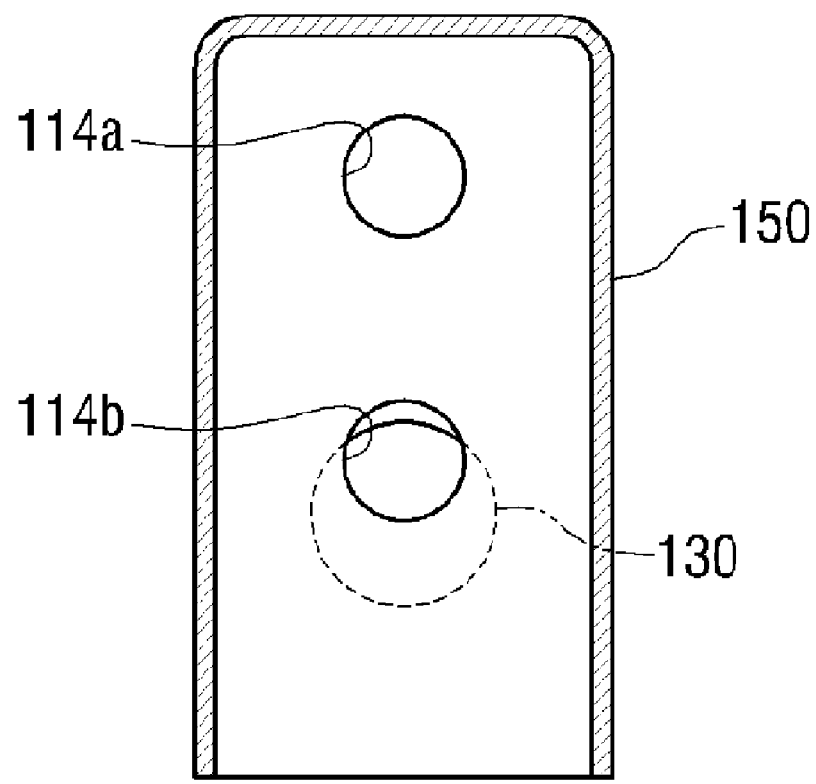
FIGS. 11 and 12 are sectional views showing another example of orifice holes formed in a main body part of the automatic gas intake and exhaust valve device according to the first embodiment of the present invention.

Referring to FIG. 11, although the automatic gas intake and exhaust valve device 100 according to the first embodiment has the elongated orifice hole 113, the present invention is not limited thereto, but the present invention may employ two orifice holes 114a and 114b spaced apart from each other by a predetermined interval. At least one of the two orifice holes 114a and 114b is provided corresponding to the position of the gas intake and exhaust hole 115.

When the two orifice holes 114a and 114b are provided as described above, if the level of the fluid introduced into the space part 111 of the main body part 110 and the coupling member 150 is increased, the fluid is primarily introduced through the lower orifice hole 114b, so that air is discharged out of the space part 111 of the body part 110 and the coupling member 150. Then, the fluid is secondarily introduced through the upper orifice hole 114a, so that the flow velocity of the fluid occurs. Accordingly, the opening/closing member 130 floats in the fluid to close the gas intake and exhaust hole 115.

Figure 12:
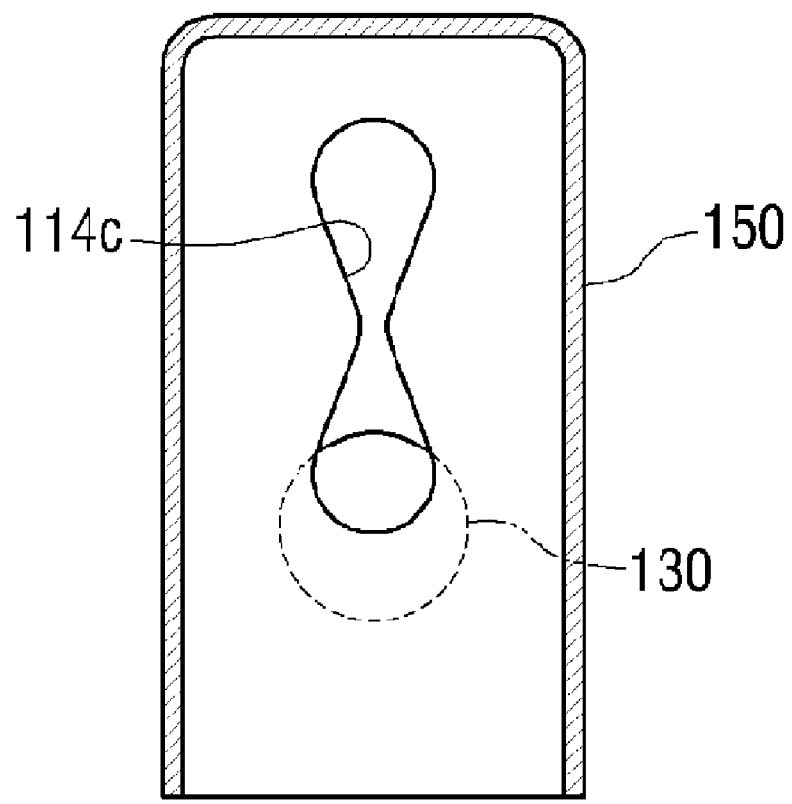

Referring to FIG. 12, a single orifice hole 114c may be naturally formed with a narrower central portion in the shape of a peanut. In this case, even when the single orifice hole 114c in the shape of a peanut is employed, the opening/closing member 130 closes the gas intake and exhaust hole 115 in the same manner as the case that the two orifice holes are formed.

Figure 13:
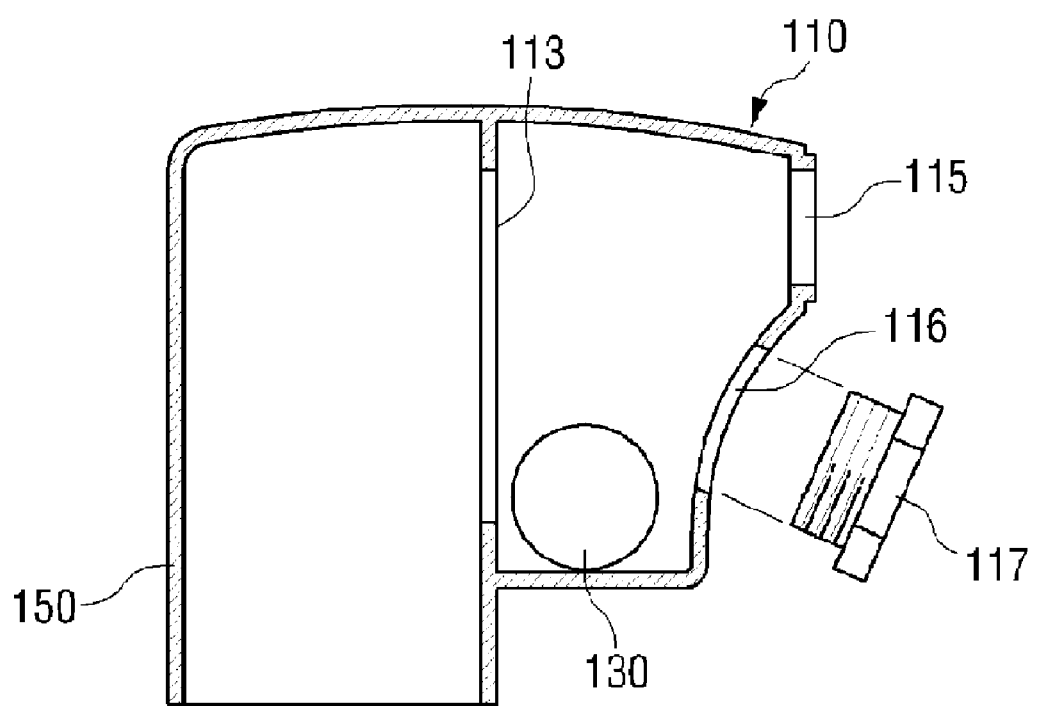
FIG. 13 is a sectional view showing the automatic gas intake and exhaust valve device according to the first embodiment of the present invention which has a cleaning port installed therein.

Referring to FIG. 13, the automatic gas intake and exhaust valve device 100 according to the first embodiment is provided at one side of the main body part 110 thereof with the drawing hole 116 for the repair and maintenance work of the opening/closing member 130 provided in the main body part 110. The drawing hole 116 serves as a cleaning port used to draw the opening/closing member 130 and clean the inner part of the main body part 110 and the opening/closing member 130. The drawing hole 116 is equipped with a plug 117 for cleaning, which is detachably coupled with the drawing hole 116. The plug 117 closes the drawing hole 116 in ordinary times, and is removed in cleaning and maintenance. In this case, the plug 117 is coupled to the drawing hole 116 by using a screw, and preferably provided with a packing member such as a seal ring in order to prevent water leak when the plug 117 is coupled to the drawing hole 116.

In addition, the automatic gas intake and exhaust valve device 100 according to the first embodiment can be mutually coupled to the pipe 183 through various coupling structures as shown in FIGS. 14 to 22.

Figure 14:
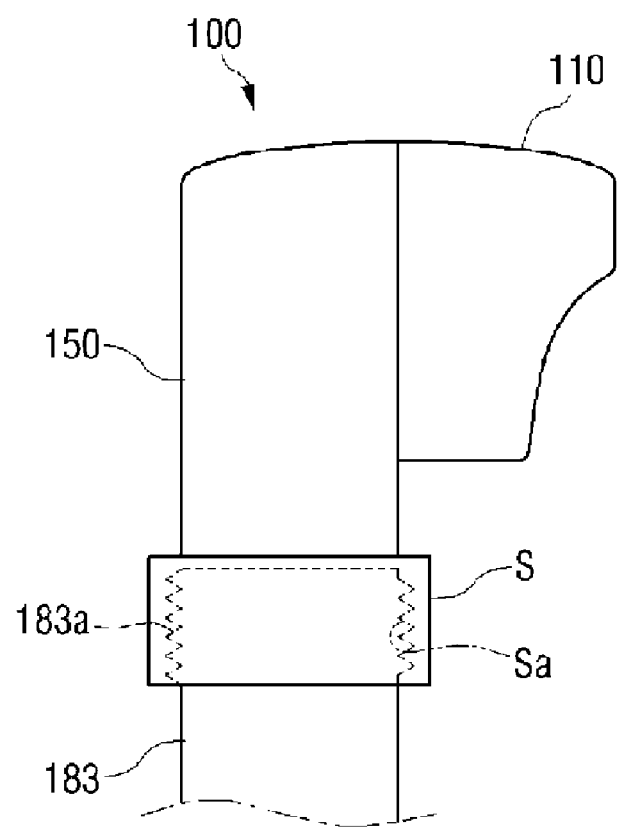
FIGS. 14 to 22 are sectional views showing various coupling structures applied to a pipe and the automatic gas intake and exhaust valve device according to the first embodiment of the present invention.

In other words, referring to FIG. 14, the automatic gas intake and exhaust valve device 100 is coupled to the pipe 183 through a screw coupling scheme. In other words, a socket S having a thread Sa formed along at an inner peripheral portion thereof extends toward an open end of the coupling member 150, and a thread 183a screwed with the thread Sa of the socket S is formed along an outer peripheral portion of one end of the pipe 183 inserted into the socket S.

Figure 15:
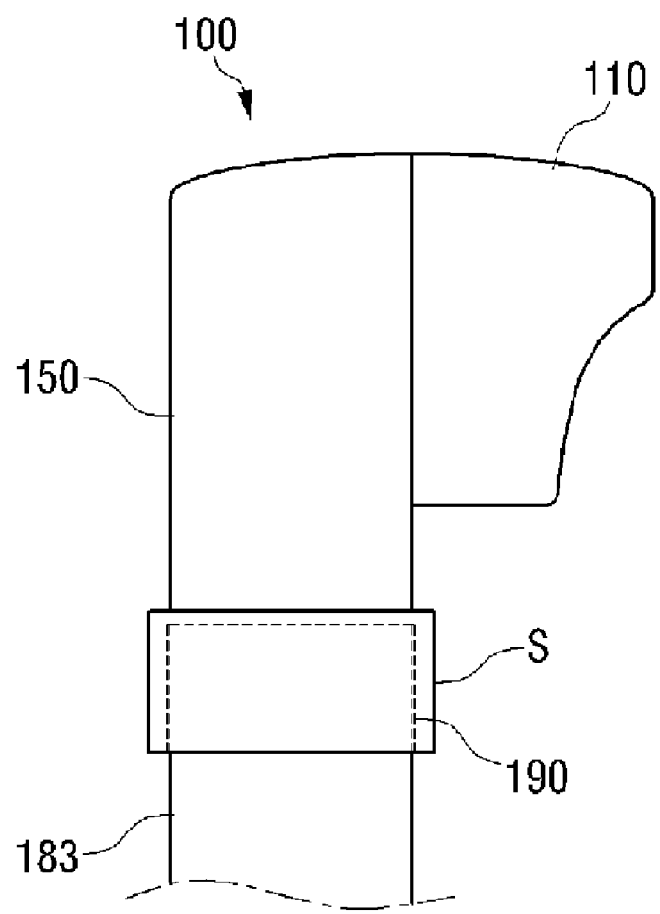

Referring to FIG. 15, the automatic gas intake and exhaust valve device 100 is coupled to the pipe 183 through a bonding scheme. In other words, the socket S receiving one end of the pipe 183 extends to the open end of the coupling member 150, and an adhesive 190 such as a bond is applied to the inner peripheral portion of the socket S. Then, one end of the pipe 183 is inserted into the socket S, so that the pipe 183 is mutually coupled to the socket S. The bonding scheme is preferably employed when the coupling member 150 and the pipe 183 include synthetic resin materials such as PVC pipes.

Figure 16:
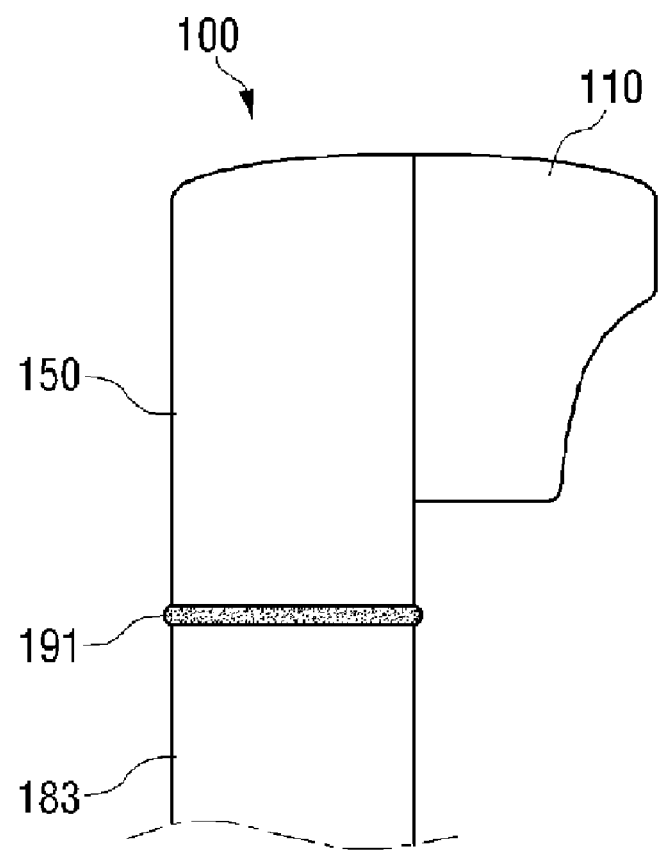

Referring to FIG. 16, the automatic gas intake and exhaust valve device 100 is mutually coupled to the pipe 183 through a welding scheme. The welding scheme may be employed when both of the coupling member 150 and the pipe 183 include metallic materials or synthetic resin materials. Reference numeral 191 of FIG. 16, which is not described, represents a weld bead.

Referring to FIGS. 17 to 22, the automatic gas intake and exhaust valve device 100 may be mutually coupled to the pipe 183 through a union coupling scheme employing a joint member.

Figure 17:
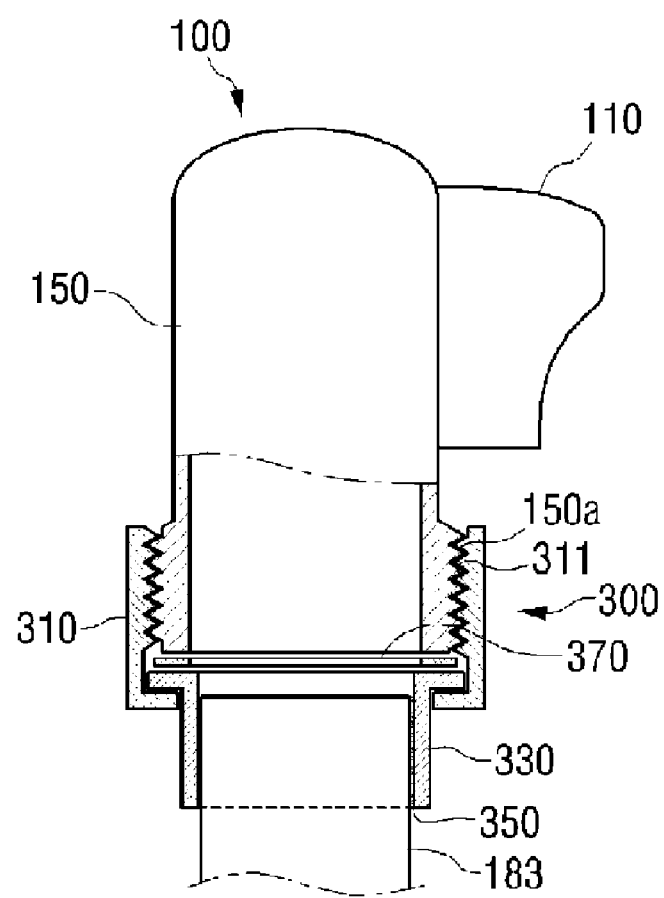
Figure 18:
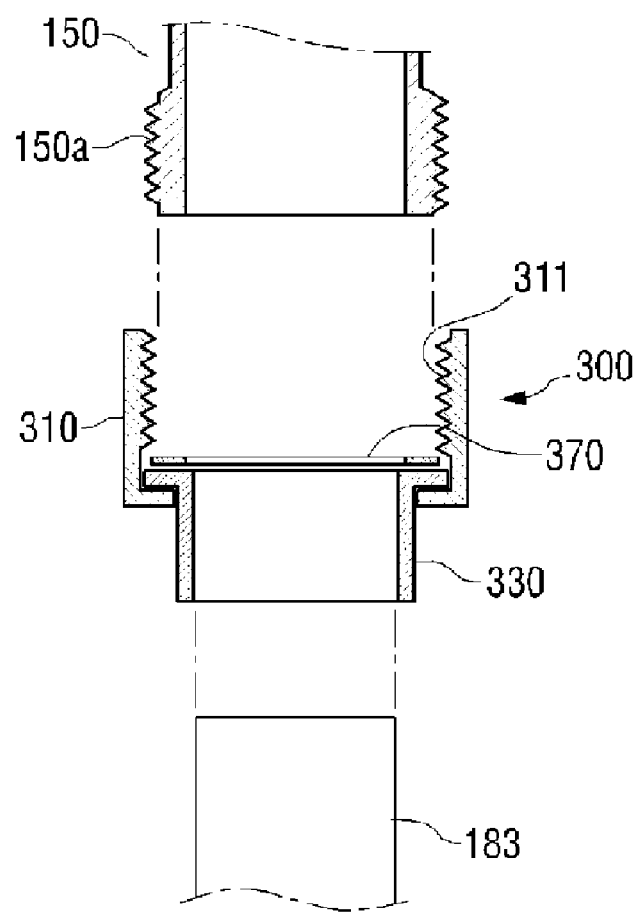

The coupling scheme shown in FIGS. 17 and 18 is a union bonding scheme. Accordingly, a joint member 300 includes a first part 310 receiving one end of the coupling member 150 therein and a second part 330 receiving one end of the pipe 180 therein. The first part 310 has a thread 311 at the inner part thereof so that a thread 150a formed at one end of the coupling member 150 is screwed with the first part 310. The second part 330 is coupled with the pipe 183 through an adhesive applied to the inner peripheral portion of the second part 330. In this case, a packing 370 including a rubber material is provided at the contact part between the second part 330 and the coupling member 150, thereby preventing water leak between the automatic gas intake and exhaust valve device 100 and the pipe 183.

Figure 19:
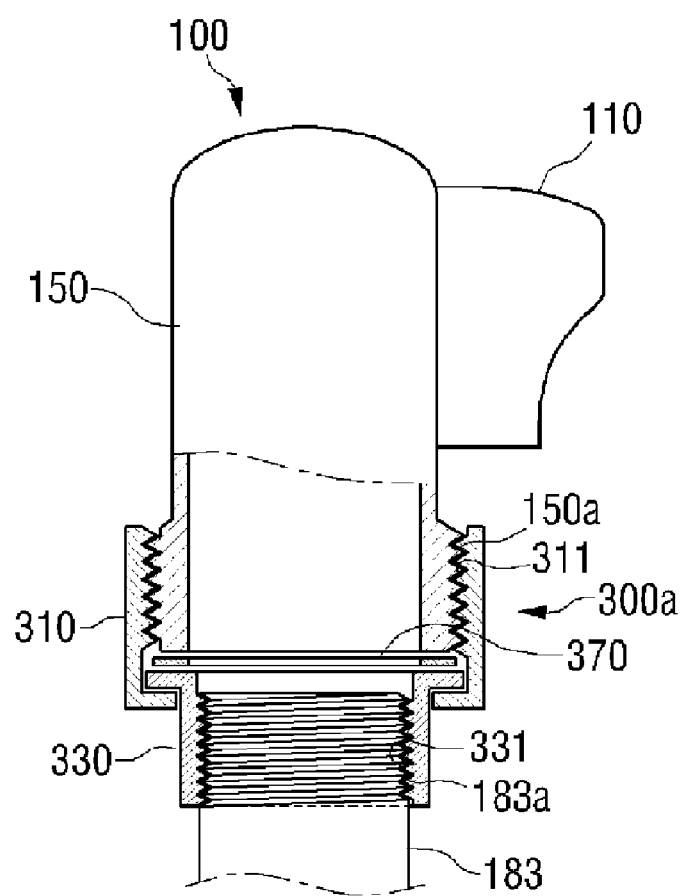
Figure 20:
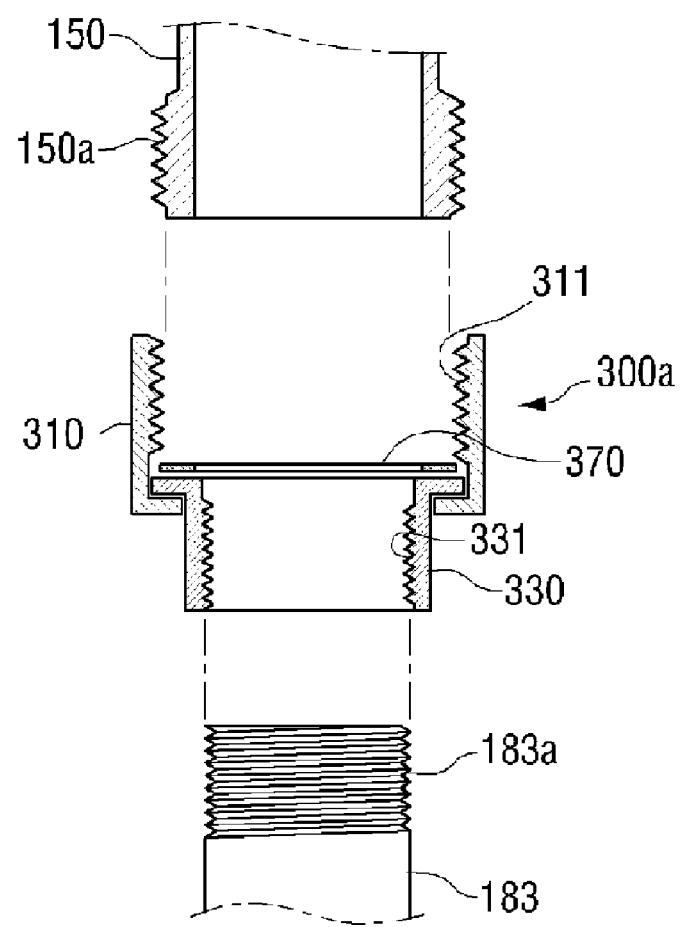

The coupling scheme shown in FIGS. 19 and 20 is a union coupling scheme using a screw. A joint member 300a has the structure substantially identical to that of the joint member 300 shown in FIGS. 17 and 18 except that the pipe 183 is coupled with the second part 330 by using a screw instead of an adhesive. For the purpose of the screw coupling, a thread 183a is formed at an outer peripheral surface of the pipe 183, and a thread 331 is formed at an inner peripheral surface of the second member 330.

Figure 21:
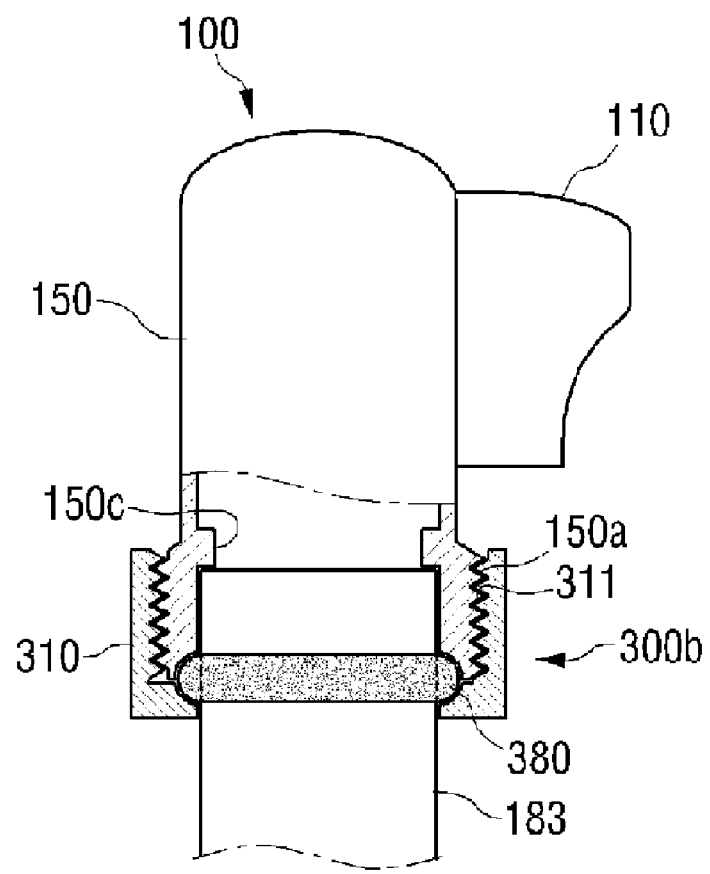
Figure 22:
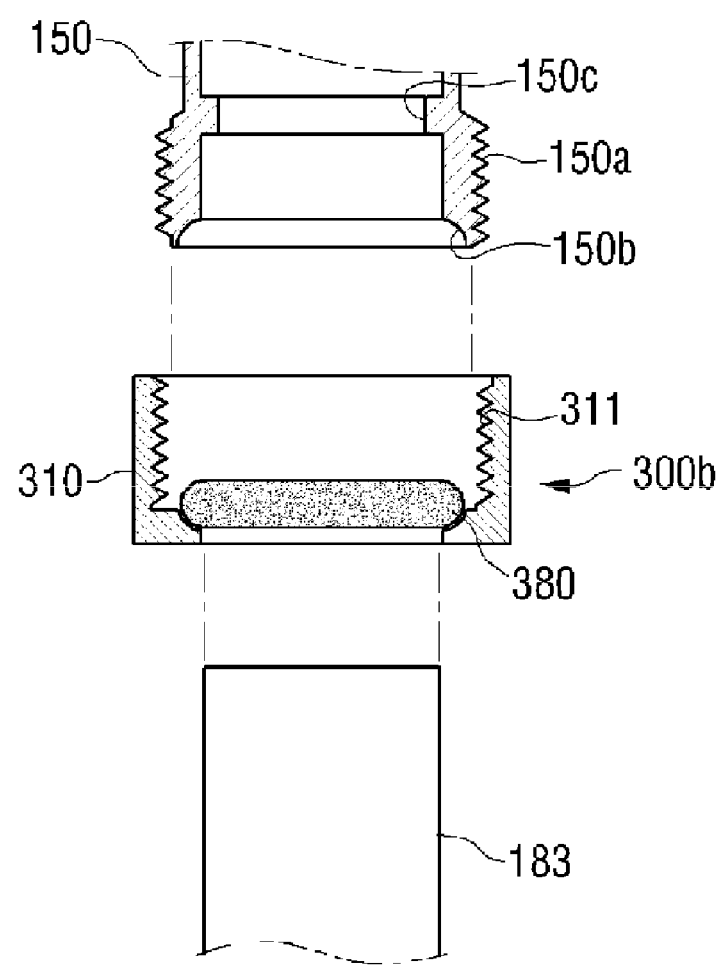

The coupling scheme shown in FIGS. 21 and 22 is a union coupling scheme using a compression ring 380. A joint member 300b includes the first part 31 and the compression ring 380. The coupling member 150 and the first part 310 are detachably coupled with each other through their respective threads 150a and 311.

The compression ring 380 may include one of natural rubber, synthetic rubber, Teflon, and synthetic resin having elasticity. The compression ring 380 is fitted around the outer peripheral portion of the pipe 183 in the state that the compression ring 380 is placed inside the first part 310. In this case, if the first part 310 is rotated in the coupling direction with the coupling member 150, the compression ring 380 is gradually pressed by an open end 150b of the coupling member 150 while closely making contact with the first part 310, the coupling member 150, and the pipe 183, thereby preventing the water leak between the automatic gas intake and exhaust valve device 100 and the pipe 183.

In this case, the coupling member 150 is provided at the inner peripheral portion thereof with a stopper 150c protruding from the open end 150b toward the inner part of the coupling member 150 by a predetermined interval. The stopper 15c restricts the insertion depth of the pipe 183 into the automatic gas intake and exhaust valve device 100 when the automatic gas intake and exhaust valve device 100 is mutually coupled with the pipe 183 through the joint member 300b.

Figure 23:
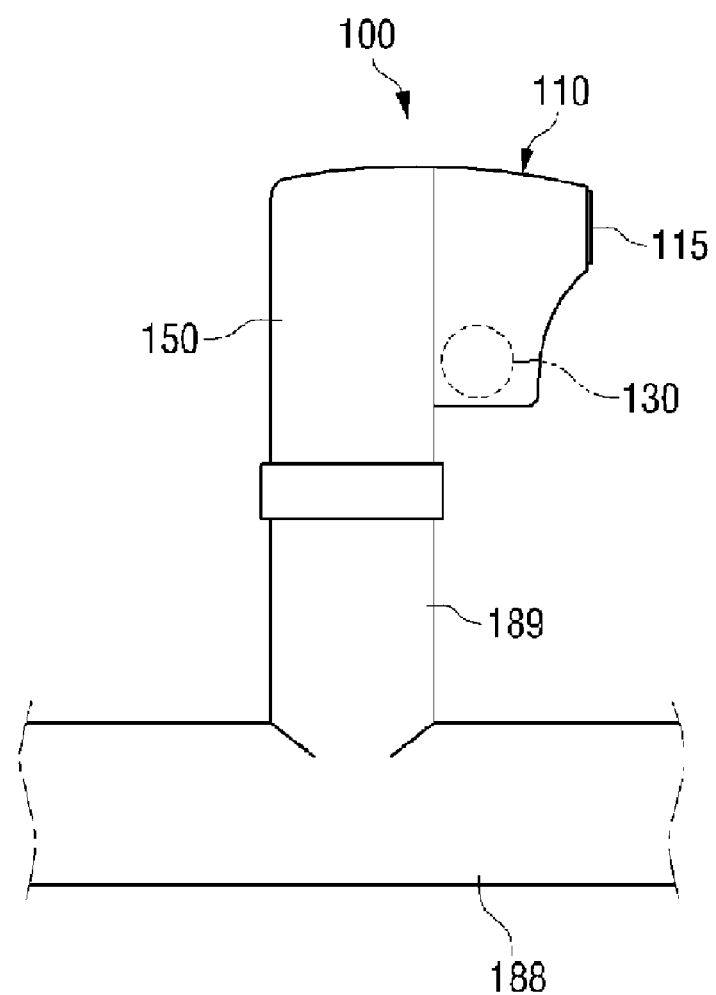
FIG. 23 is a schematic view showing the automatic gas intake and exhaust valve device according to the first embodiment of the present invention which is installed in a vertical pipe branching from a horizontal pipe.

Referring to FIG. 23, the automatic gas intake and exhaust valve device 100 according to the first embodiment may be installed in a first pipe 188, which is horizontally arranged, and a second pipe 189, which vertically branches, for the use.

Figure 25:
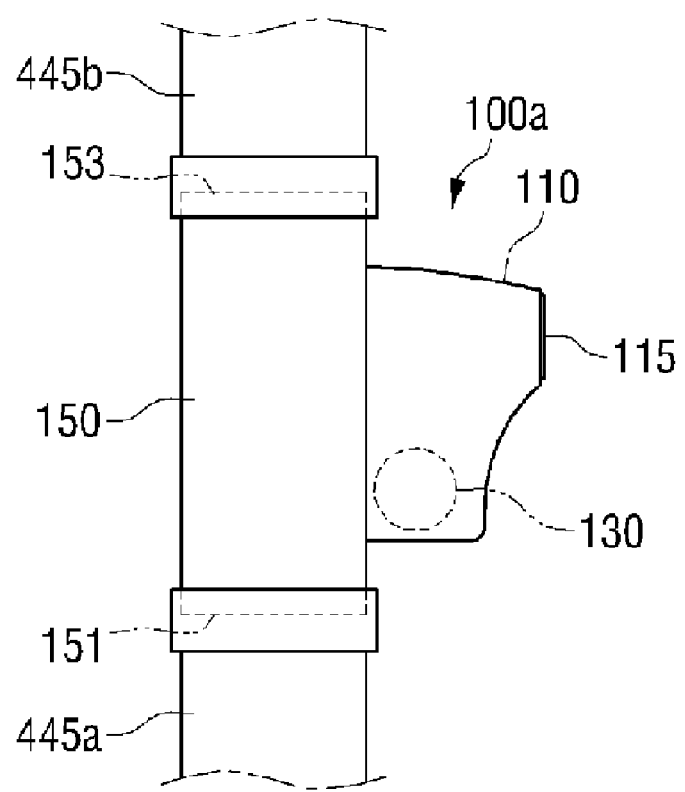

Hereinafter, an automatic gas intake and exhaust valve device 100a according to a second embodiment will be described. The automatic gas intake and exhaust valve device 100a according to the second embodiment of the present invention has a structure and components substantially identical to those of the automatic gas intake and exhaust valve device 100 according to the first embodiment except that the coupling member 150 has two openings 151 and 153 as shown in FIG. 25. Therefore, the structure and the components of the automatic gas intake and exhaust valve device 100a according to the second embodiment identical to those of the automatic gas intake and exhaust valve device 100 according to the first embodiment will not be further described.

Figure 24:
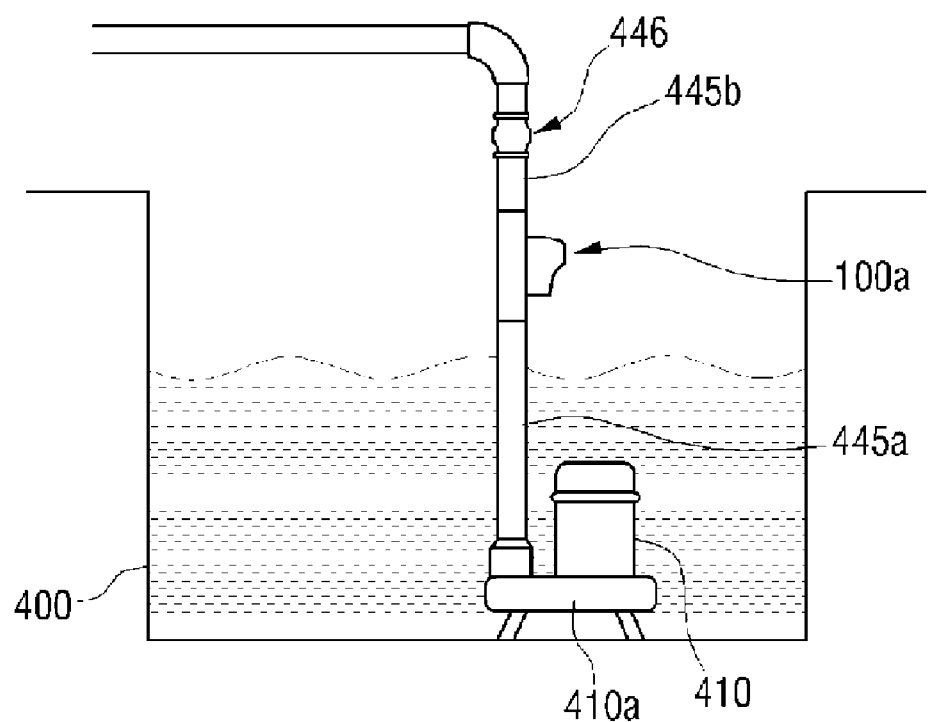
FIGS. 24 and 25 are views showing an automatic gas intake and exhaust valve device according to a second embodiment of the present invention which is installed in a submersible pump device.

Referring to FIGS. 24 and 25, when a pair of pipes are provided, the automatic gas intake and exhaust valve device 100a according to the second embodiment may be installed between the pipes through the structure of the coupling member 150 shown in FIG. 25 for the use.

For example, as shown in FIG. 24, the automatic gas intake and exhaust valve device 100a according to the second embodiment is applicable to a pair of discharge pipes 445a and 445b linked with a submersible pump 410 installed in a sump basin 400 of a waste water discharging device. In this case, when the waste water is pumped from the sump basin 400, air in the lower discharge pipe 445a of a pair of the discharge pipes 445a and 445b and a pump casing 410a is discharged. Therefore, air lock caused by the air in each part of the device can be prevented.

The air in the lower discharge pipe 445a and the pump casing 410a is discharged when the waste water is pumped from the sump basin 400 as described above, so that the submersible pump 410 can be prevented from being overheated due to the continuous idle rotation thereof to protect the submersible pump 410.

Reference numeral 446 of FIG. 24, which is not described, represents a check valve to prevent the waste water from flowing back to the submersible pump 410.

Hereinafter, the operation of the automatic gas intake and exhaust valve device 100a according to the second embodiment will be described with reference to FIGS. 26 to 29.

First, if the submersible pump 410 is operated to pump the fluid, for example, waste water W1 from the sump basin 400, the waste water W1 is introduced into the coupling member 150 through the pipe 445a linked with the opening 151 provided at one side of the coupling member 150.

Figure 26:
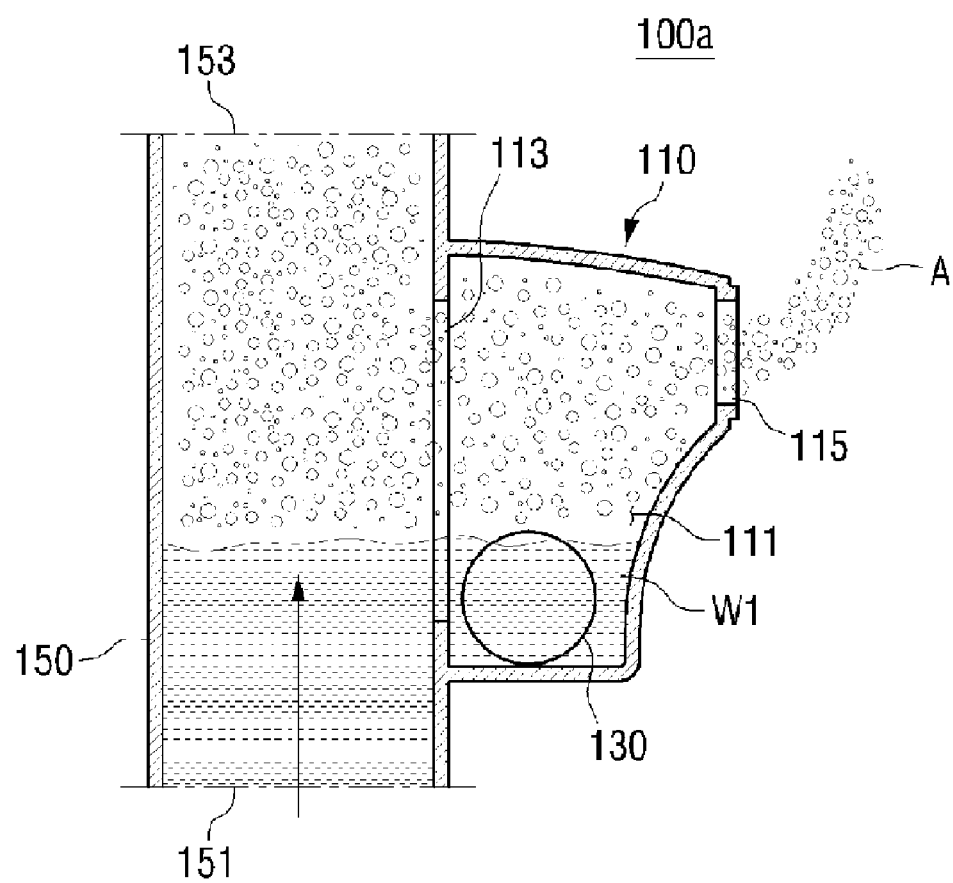
FIGS. 26 to 29 are sectional views showing the operation of the automatic gas intake and exhaust valve device according to the second embodiment of the present invention.

The waste water W1 introduced into the coupling member 150 is introduced into the space part 111 of the main body part 110 through the orifice hole 113 having a small diameter as shown in FIG. 26. At this time, the waste water W1 is introduced into the space part 111 of the main body part 110 at a flow velocity faster than the flow velocity to introduce the waste water W into the coupling member 150 from the pipe 445a. In this case, since the opening/closing member 130 has the specific gravity greater than that of the water, the opening/closing member 130 does not float, but remains in the sinking state.

Figure 27:
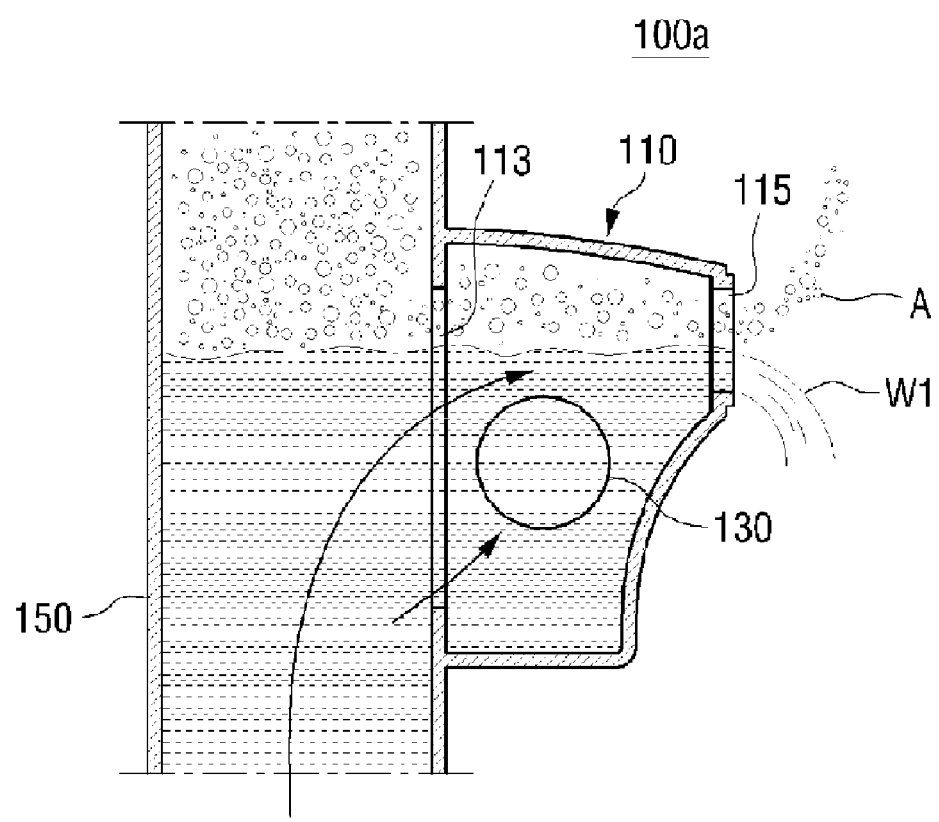
Figure 28:
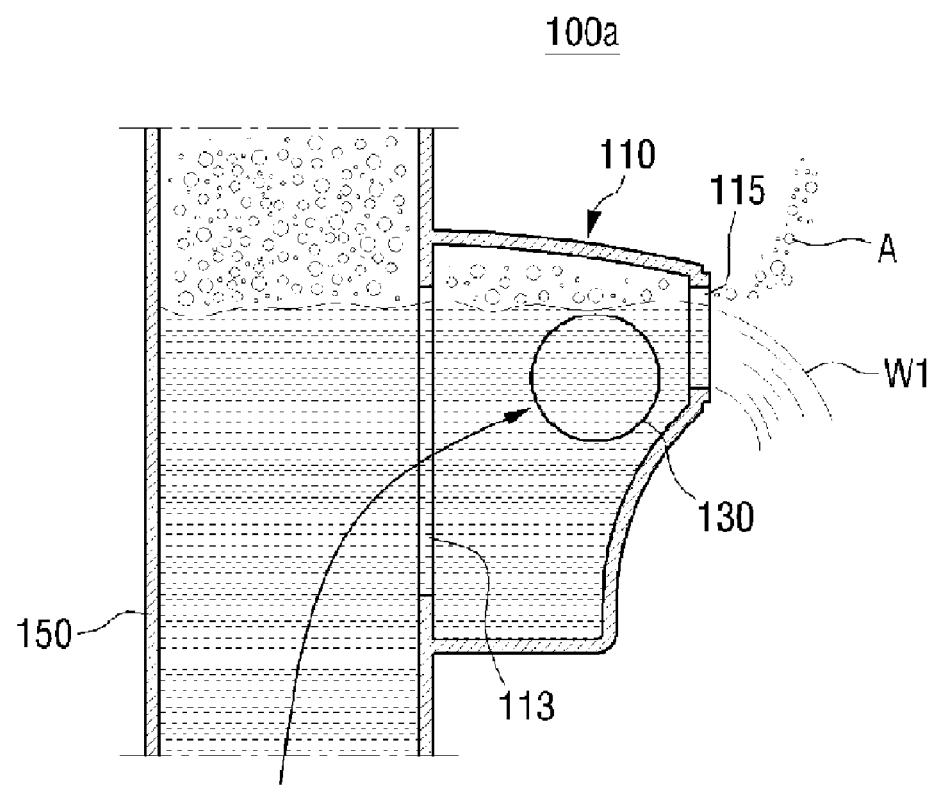

Subsequently, as shown in FIG. 27, as the waste water W1 is continuously introduced through the orifice hole 113, the opening/closing member 130 is completely submerged under the waste water W. In this case, since the pressure on the top of the opening/closing member 130 is lowered than the pressure on the bottom of the opening/closing member 130 by the waste water W rapidly introduced through the orifice hole 113 according to the Bernoulli's effect, the opening/closing member 130 rises to move toward the gas intake and exhaust hole 115 as shown in FIG. 28 due to the dynamic pressure of the waste water W1. As the opening/closing member 130 rises after a predetermined time interval, the air A in the discharge pipe 445a, the pump casing 410a of the submersible pump 410, the coupling member 150, and the space part 111 of the main body part 110 is fully exhausted through the gas intake and exhaust hole 115. In this case, since the gas intake and exhaust hole 115 has a size larger than that of the valve device according to the related art, the clogging caused by sediments or sludge contained in the waste water W1 can be reduced.

Figure 29:
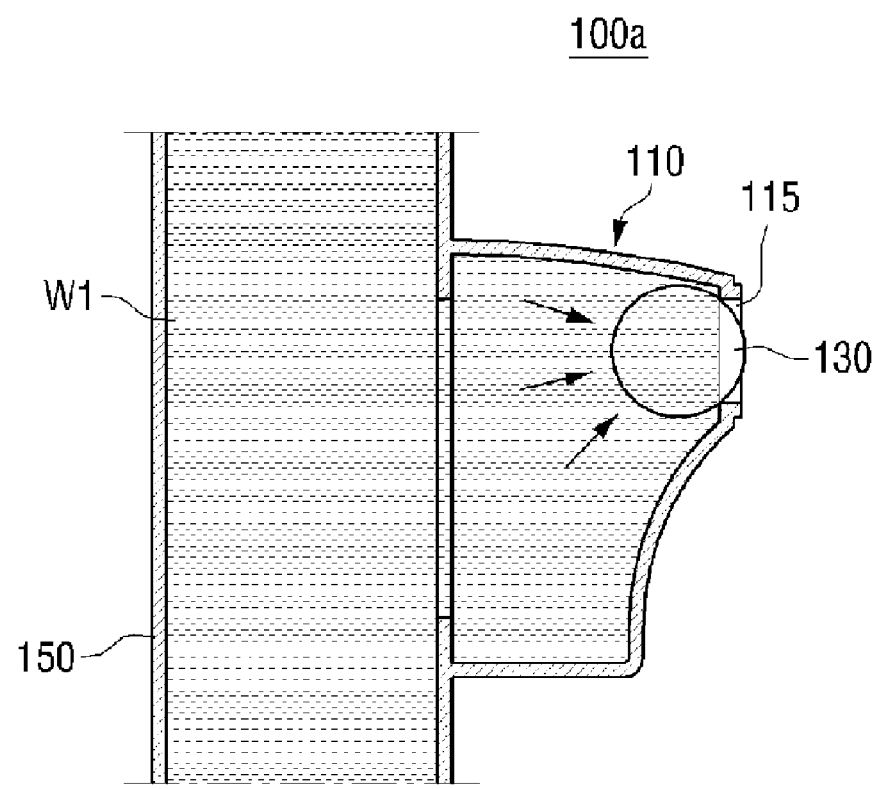
Figure 30:
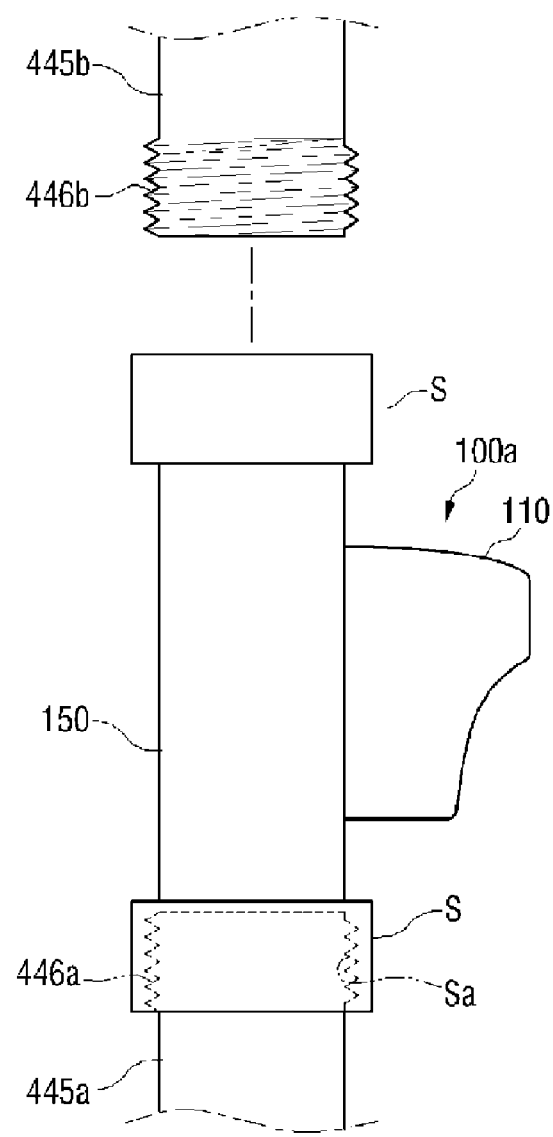
FIGS. 30 to 35 are schematic views showing various coupling structure applied to a pipe and the automatic gas intake and exhaust valve device according to the second embodiment of the present invention.
Figure 31:
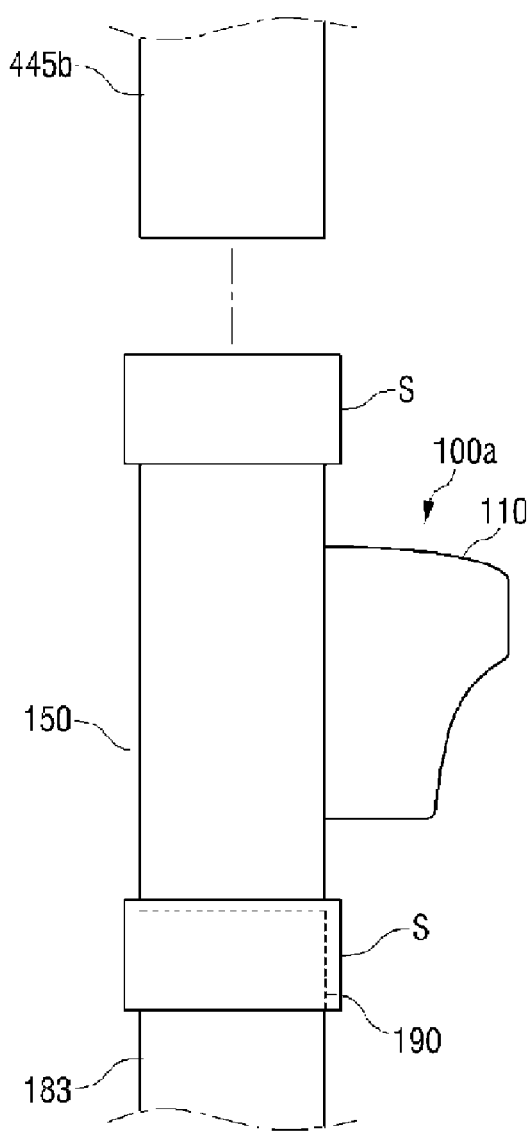
Figure 32:
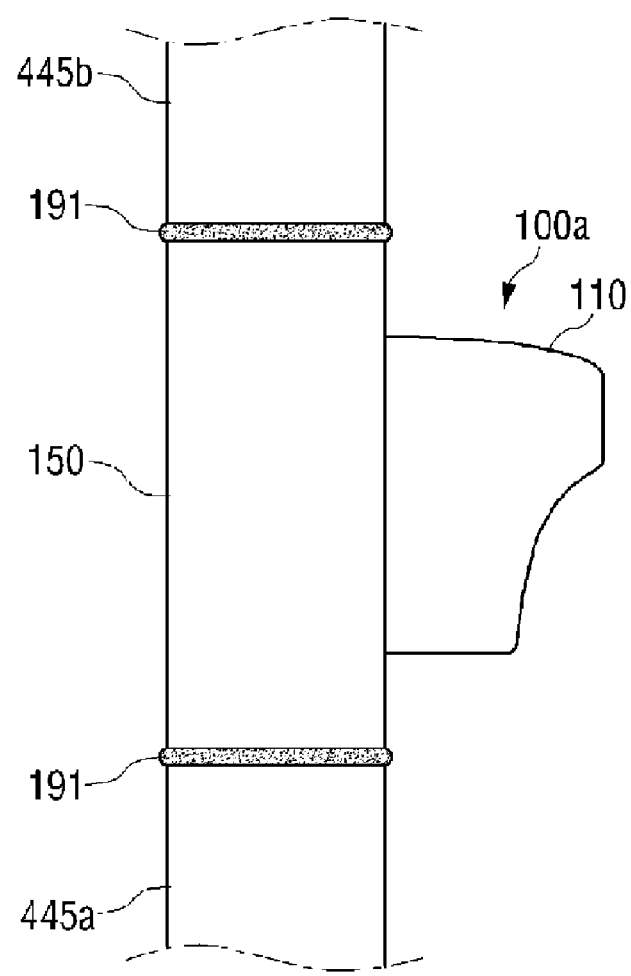

Thereafter, as shown in FIG. 29, the opening/closing member 130 completely closes the gas intake and exhaust hole 115 due to the static pressure of the fluid contained in the discharge pipe 445a. Accordingly, the air in the lower discharge pipe 445a and the pump casing 410a is discharged, so that the waste water W1 is smoothly discharged through the opening 153 of the coupling member 150 coupled with the upper discharge pipe 445b without the air lock.

Similarly to the first embodiment, the procedure of FIGS. 26 to 29 can be performed in a very short time of period according to the second embodiment.

Meanwhile, if the operation of the submersible pump 410 is stopped, the waste water W1 in the lower discharge pipe 445a is moved back to the submersible pump 410 due to the gravity of the waste water W1. Simultaneously, the opening/closing member 130 drops down to the bottom of the space part 111 of the main body part 110 due to the weight of the opening/closing member 130 to open the gas intake and exhaust hole 115, thereby making a stand-by state that air can be discharged when the submersible pump 410 is operated for the next discharge of waste water.

Similarly to the first embodiment, the automatic gas intake and exhaust valve device 100a according to the second embodiment can be mutually coupled with pipes through various coupling structures. In other words, as shown in FIGS. 30 to 35, the automatic gas intake and exhaust valve device 100a according to the second embodiment can be mutually coupled with the pipes 445a and 445b through various mutual coupling structures, and the details of the coupling structures will be omitted since the coupling structures are the same as those of the first embodiment. Reference numerals 446a and 446b of FIG. 30, which are not described, represent threads, respectively. Reference numerals 150a and 311 of FIGS. 33 to 35, which are not described, and reference numeral 446a of FIG. 34, which is not described, represent threads, respectively.

Figure 33:
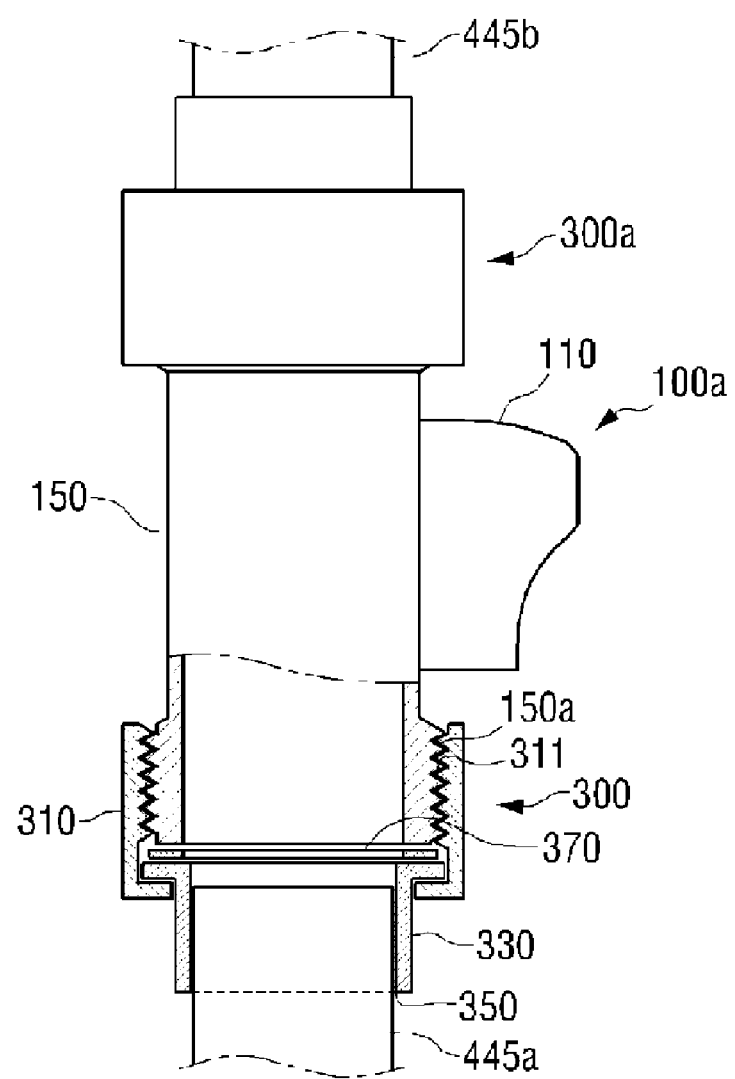
Figure 34:
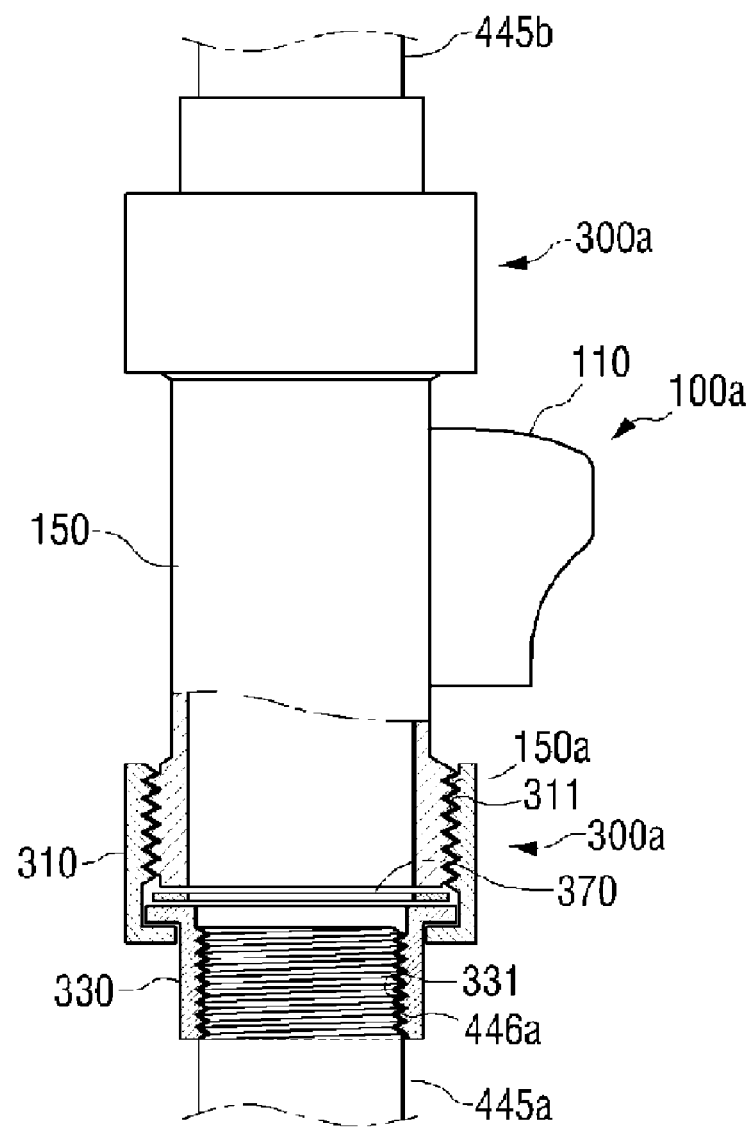
Figure 35:
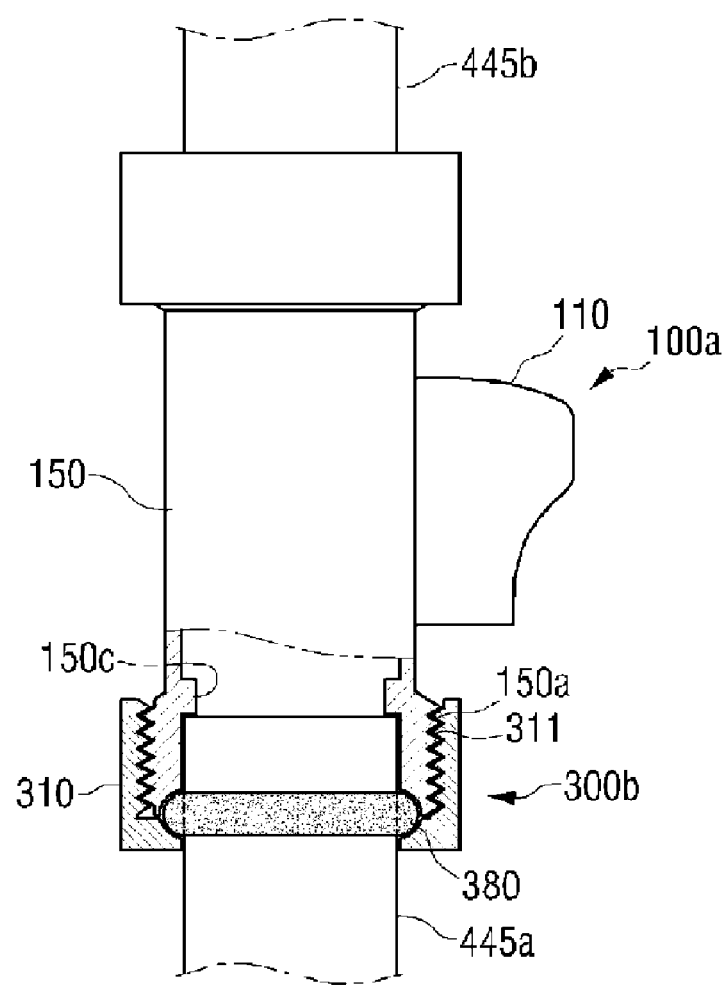

The coupling structure between the automatic gas intake and exhaust valve device 100a according to the second embodiment and the pipes 445a and 445b may be constructed through a screw coupling scheme (see FIG. 30), a bonding scheme (see FIG. 31), and a welding scheme (see FIG. 33). In addition, the automatic gas intake and exhaust valve device 100a according to the second embodiment may be installed between the pipes 445a and 445b through a union bonding scheme (see FIG. 34), a union coupling scheme by using a screw (see FIG. 35), and a union coupling scheme by using a compression ring (see FIG. 36). When the union coupling scheme are employed as described above, the automatic gas intake and exhaust valve device 100a can be easily detached from the pipes 445a and 445b, so that the repair and maintenance work for the automatic gas intake and exhaust valve device 100a can be easily performed.

Figure 36:
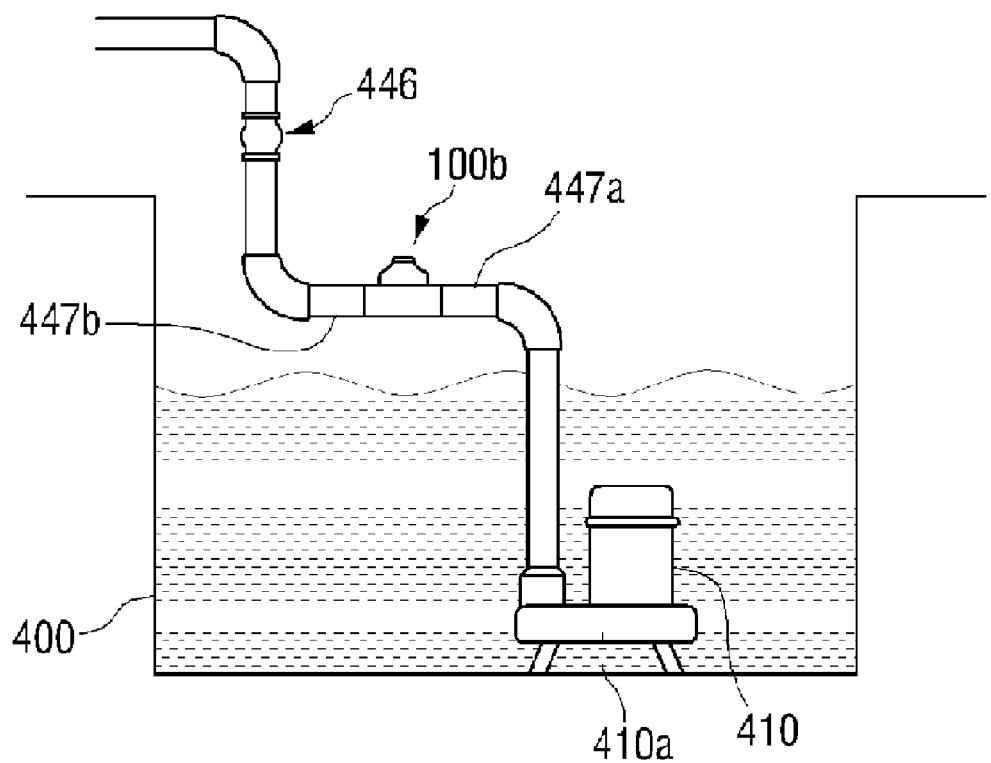
FIGS. 36 and 37 are schematic views showing an automatic gas intake and exhaust valve device according to a third embodiment of the present invention which is installed in a submersible pump device.
Figure 37:
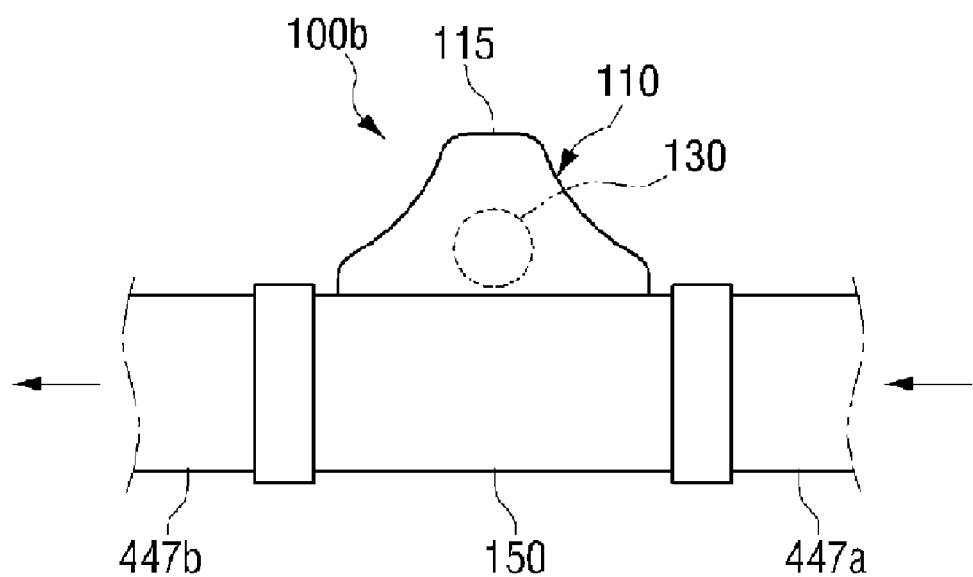

Hereinafter, an automatic gas intake and exhaust valve device 100b according to a third embodiment will be described with reference to FIGS. 36 and 37.

In this case, different from the automatic gas intake and exhaust valve devices 100 and 100a according to the first and second embodiments, the automatic gas intake and exhaust valve device 100b according to the third embodiment is applied to a pair of pipes 446a and 446b, which are horizontally arranged, instead of vertically-arranged pipes.

In this case, in the automatic gas intake and exhaust valve device 100b according to the third embodiment, both ends of the coupling member 150 are coupled with the pipes 446a and 446b which are horizontally arranged on the same axis. The main body part 110 is coupled with the upper portion of the coupling member 150, and both sides of the main body part 110 are symmetrical to each other so that the opening/closing member 130 can be lifted regardless of the direction of a fluid flowing along the pipes 446 and 446b.

The main body part 110 is mutually communicated with the coupling member 150 through the orifice hole 113. In this case, the orifice hole 113 has preferably the shape of an elongated hole.

The main body part 110 is formed in an upper end thereof with the gas intake and exhaust hole 115 used to exhaust air to the outside or suck external air. Preferably, the gas intake and exhaust hole 115 has a diameter smaller than that of the opening/closing member 130 so that the opening/closing member 130 is not placed out of the main body part 110.

Hereinafter, the operation of the automatic gas intake and exhaust valve device 100b according to the third embodiment will be described with reference to FIGS. 38 to 41.

Figure 38:
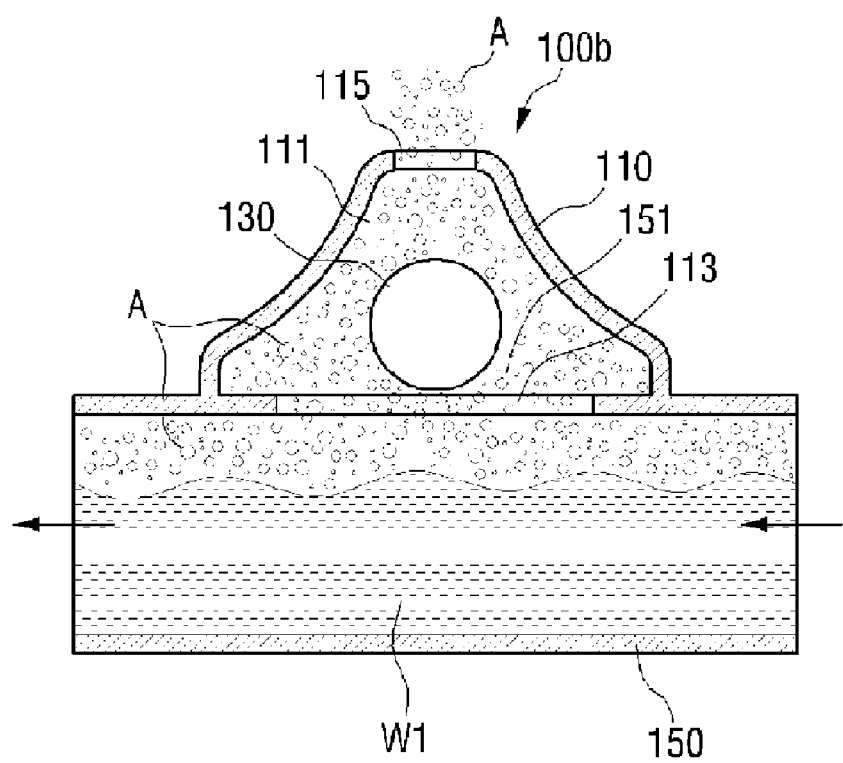
FIGS. 38 to 41 are sectional views sequentially showing the operation of the automatic gas intake and exhaust valve device according to the third embodiment of the present invention.

First, if the submersible pump 410 is operated to pump the fluid, for example, the waste water W1 contained in the sump basin 400, the waste water W1 is transferred from the pipe 447a provided at the right side of the coupling member 150 to the pipe 447b provided at the left side of the coupling member 150. Next, as shown in FIG. 38, the waste water W1 is introduced into the coupling member 150 through the horizontally-arranged pipe 447a coupled with the opening 151 provided at one side of the coupling member 150.

Figure 39:
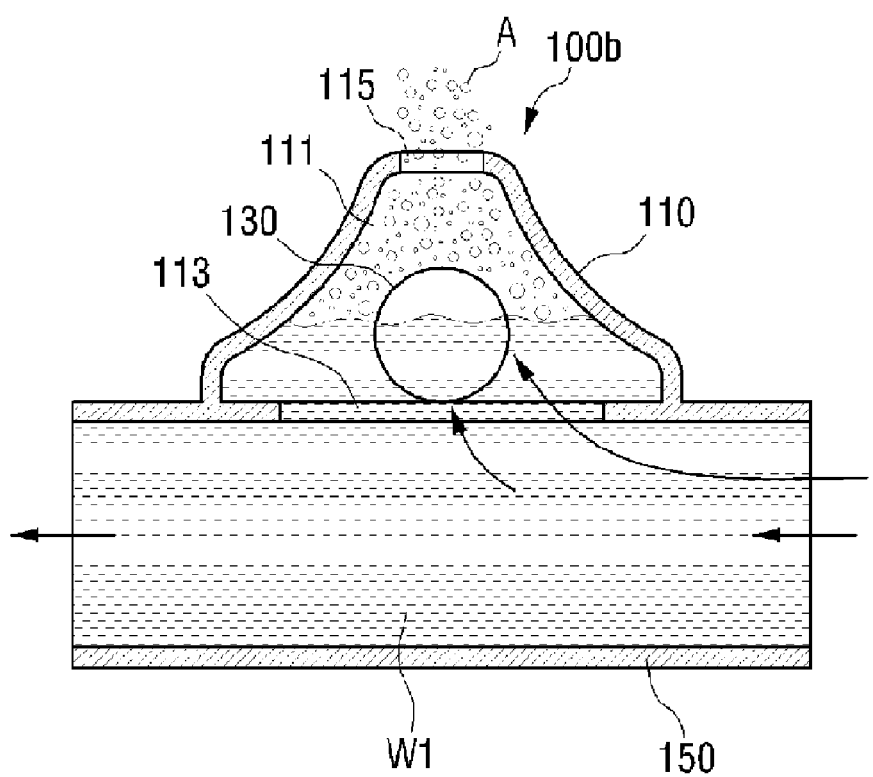

As shown in FIG. 39, the waste water W1, which has been introduced into the coupling member 150, is introduced into the space part 111 of the body part 110 through the orifice hole 113 at the flow velocity faster than the flow velocity to introduce the waste water W1 from the pipe 447a into the coupling member 150. In this case, since the opening/closing member 130 has the specific gravity greater than that of the water, the opening/closing member 130 does not float, but remains in the sinking state.

Figure 40:
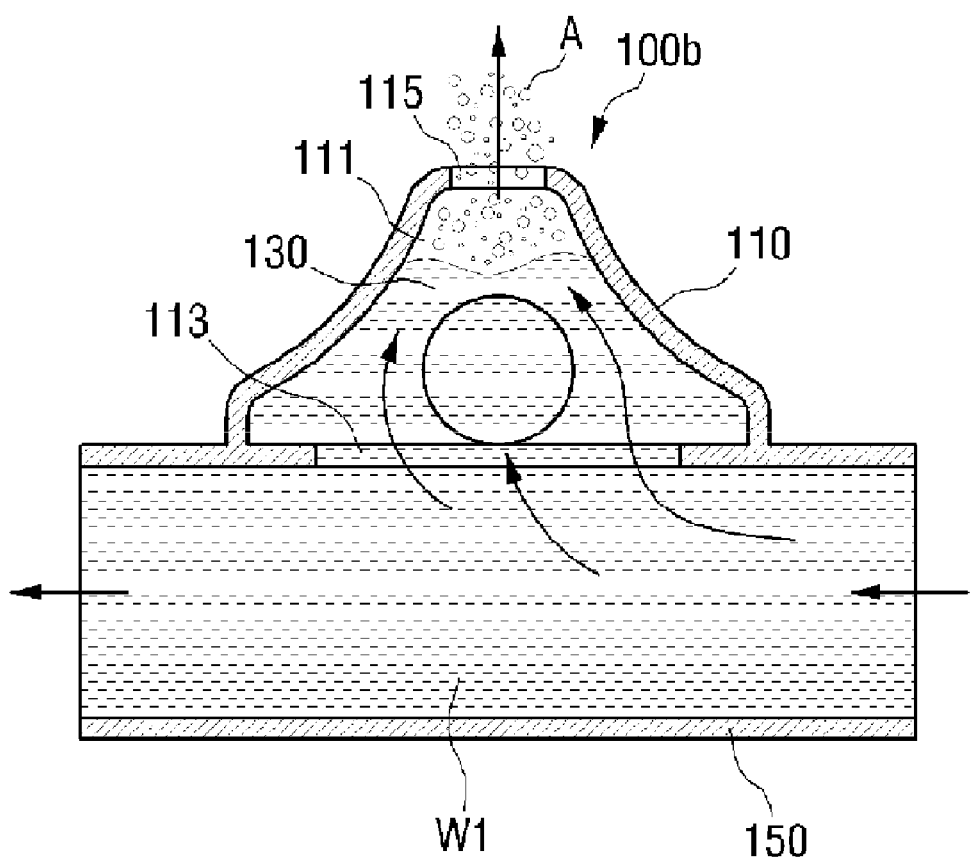

Subsequently, as shown in FIG. 40, the waste water W1 is continuously introduced through the orifice hole 113, so that the opening/closing member 130 is completely submerged under the waste water W1, In this case, the pressure on the top of the opening/closing member 130 is lower than the pressure on the bottom of the opening/closing member 130 due to the air rapidly discharged through the gas intake and exhaust hole 115 and a slight amount of the waste water W1. In this case, the opening/closing member 130 rises according to the Bernoulli's effect while moving toward the gas intake and exhaust hole 115 due to the dynamic pressure of the waste water W1. As the opening/closing member 130 rises after a predetermined time interval, the air A inside the discharge tube 447a, the submersible pump 410, the coupling member 150 and the space part 111 of the body part 110 is fully exhausted to the outside through the gas intake and exhaust hole 115. In this case, since the gas intake and exhaust hole 115 has the size larger than that of the valve device according to the related art, the clogging caused by sediments or sludge contained in the waste water W1 can be reduced.

Figure 41:
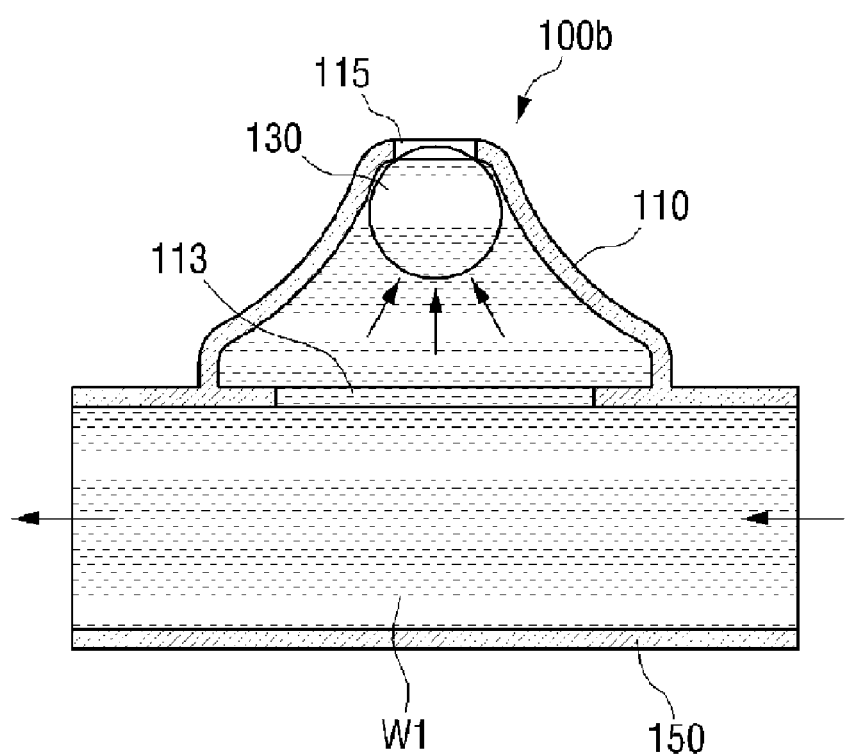
Figure 42:
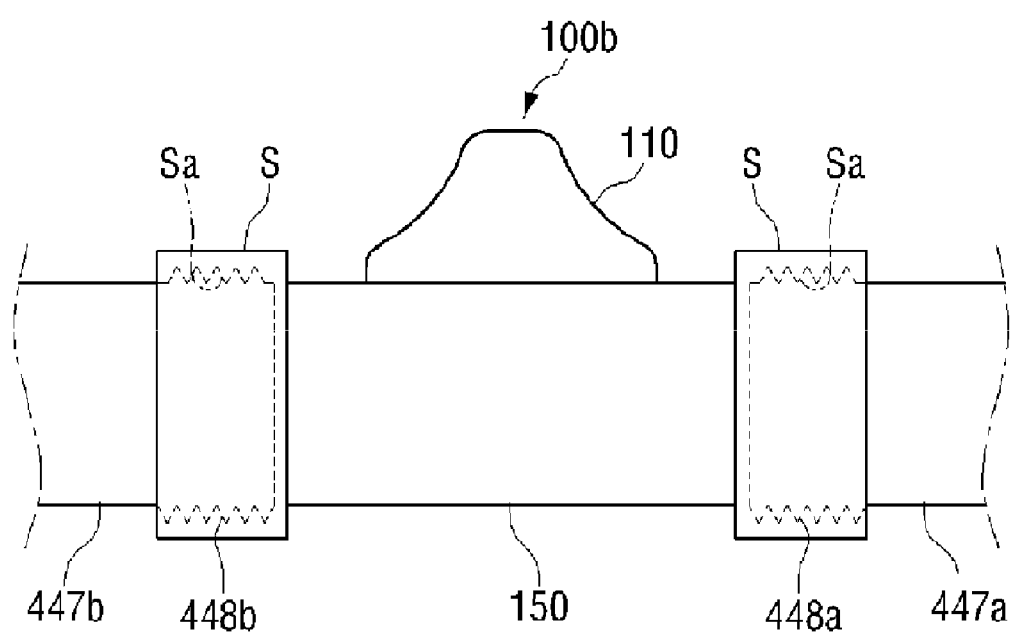
FIGS. 42 to 47 are schematic views showing various coupling structure applied to a pipe and the automatic gas intake and exhaust valve device according to the third embodiment of the present invention.
Figure 43:
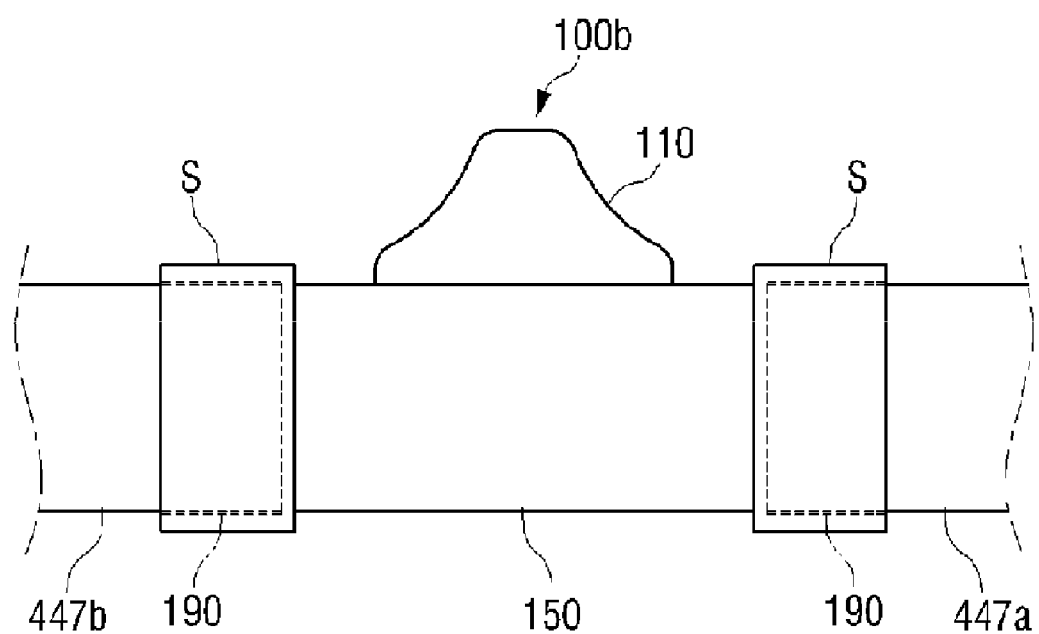

Thereafter, as shown in FIG. 41, the opening/closing member 130 completely covers the gas intake and exhaust hole 115 due to the static pressure of the fluid. Accordingly, the air inside the discharge pipe 447a is exhausted, so that the waste water W1 can smoothly flow through the discharge pipe 447b provided at one side of the coupling member 150 without the air lock.

Similarly to the first embodiment, the procedure of FIGS. 38 to 41 can be performed in a very short time of period according to the third embodiment.

Meanwhile, if the operation of the submersible pump 410 is stopped, the waste water W1 in the discharge pipes 445a and 445b is moved back to the submersible pump 410 due to the gravity of the waste water W1. Simultaneously, the opening/closing member 130 drops down to the bottom of the space part 111 of the main body part 110 due to the weight of the opening/closing member 130 to open the gas intake and exhaust hole 115, thereby making a stand-by state that air can be exhausted when the submersible pump 410 is operated for the next discharge of waste water.

Similarly to the first and second embodiments, the automatic gas intake and exhaust valve device 100b according to the third embodiment can be mutually coupled with pipes through various coupling structures. In other words, as shown in FIGS. 42 to 47, the automatic gas intake and exhaust valve device 100b according to the third embodiment can be mutually coupled with the pipes 447a and 447b through various mutual coupling structures, and the details of the coupling structures will be omitted since the coupling structures are the same as those of the first and second embodiments. Reference numerals Sa, 448a, and 448b of FIG. 42, which are not described, represent threads, respectively. Reference numerals 150a and 311 of FIGS. 45 to 47, which are not described, and reference numerals 331 and 448a of FIG. 46, which are not described, represent threads, respectively.

Figure 44:
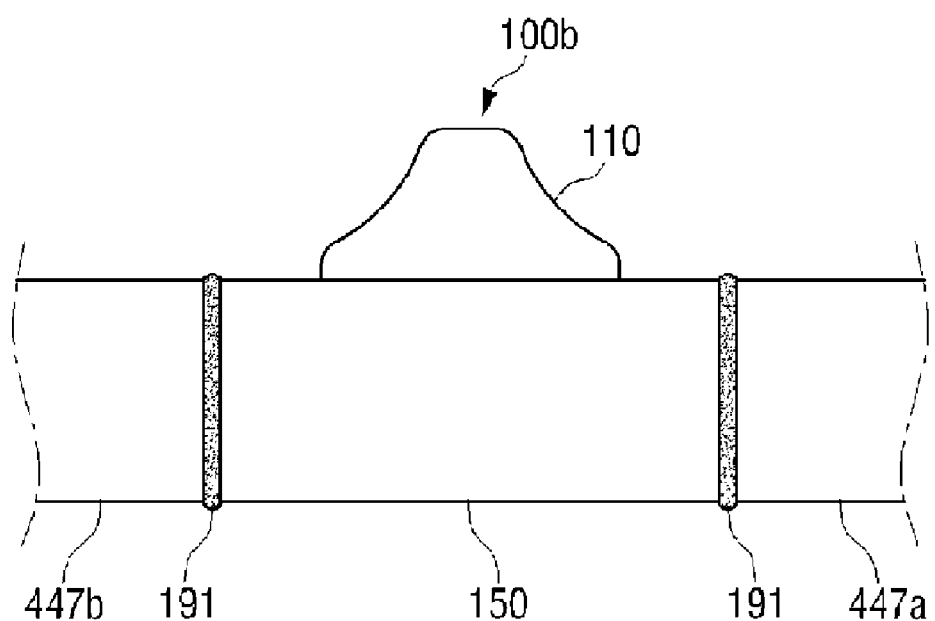
Figure 45:
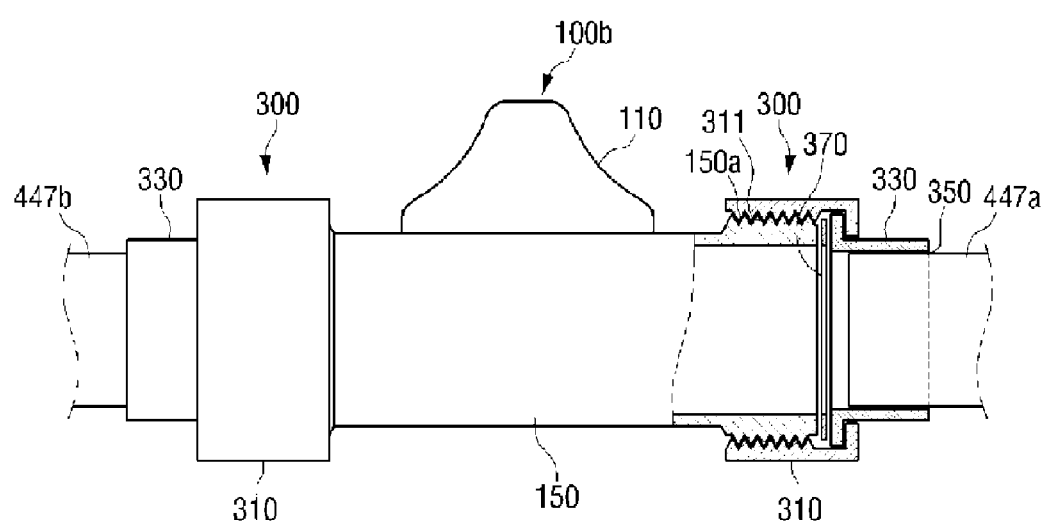
Figure 46:
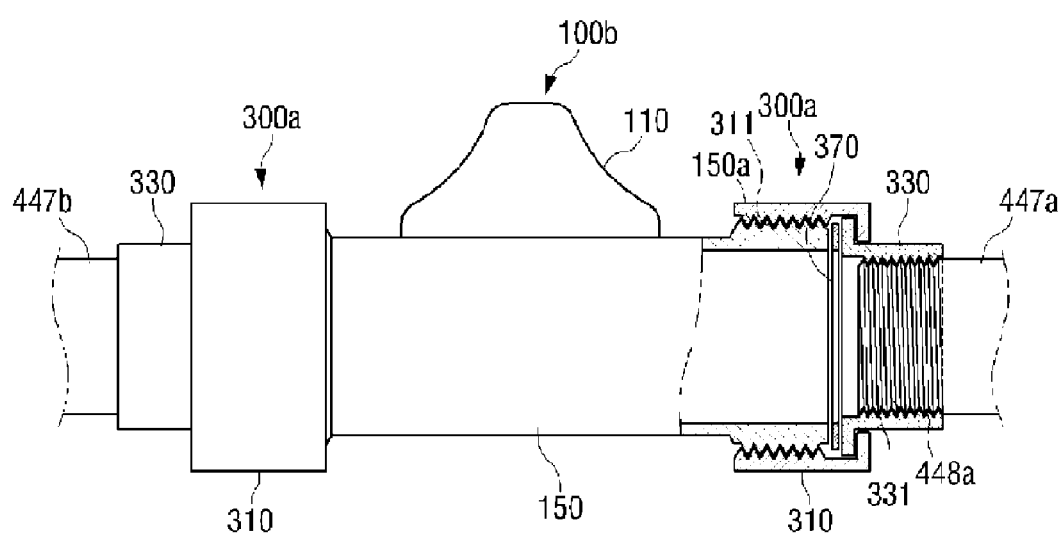
Figure 47:
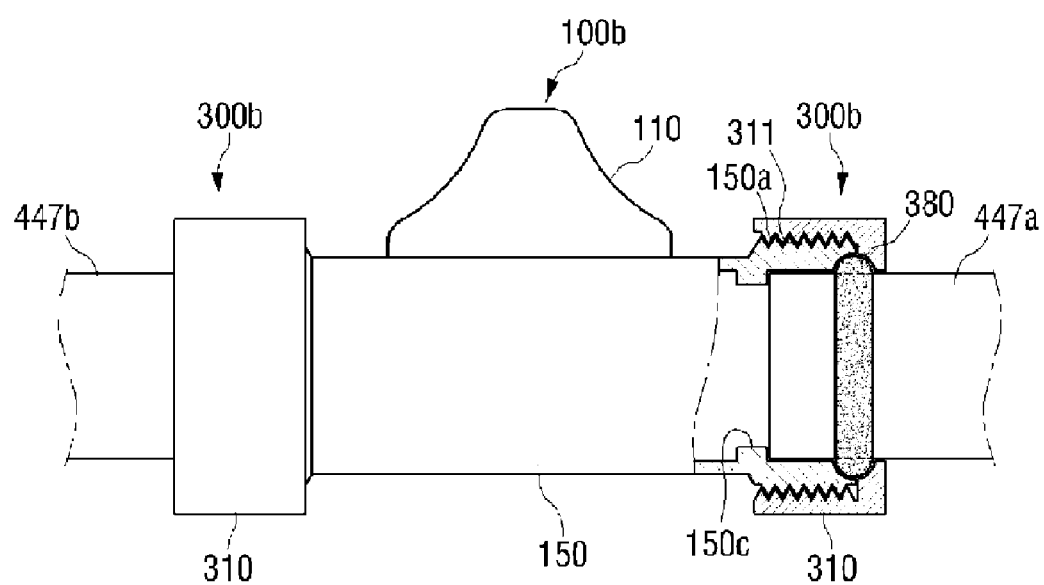

The coupling structure between the automatic gas intake and exhaust valve device 100b according to the third embodiment and the pipes 447a and 447b may be constructed through a screw coupling scheme (see FIG. 42), a bonding scheme (see FIG. 43), and a welding scheme (see FIG. 44). In addition, the automatic gas intake and exhaust valve device 100b according to the third embodiment may be installed between the pipes 447a and 447b through a union bonding scheme (see FIG. 45), a union coupling scheme by using a screw (see FIG. 46), and a union coupling scheme by using a compression ring (see FIG. 47). When the union coupling scheme are employed as described above, the automatic gas intake and exhaust valve device 100b can be easily detached from the pipes 447a and 447b, so that the repair and maintenance work for the automatic gas intake and exhaust valve device 100b can be easily performed.

Figure 48:
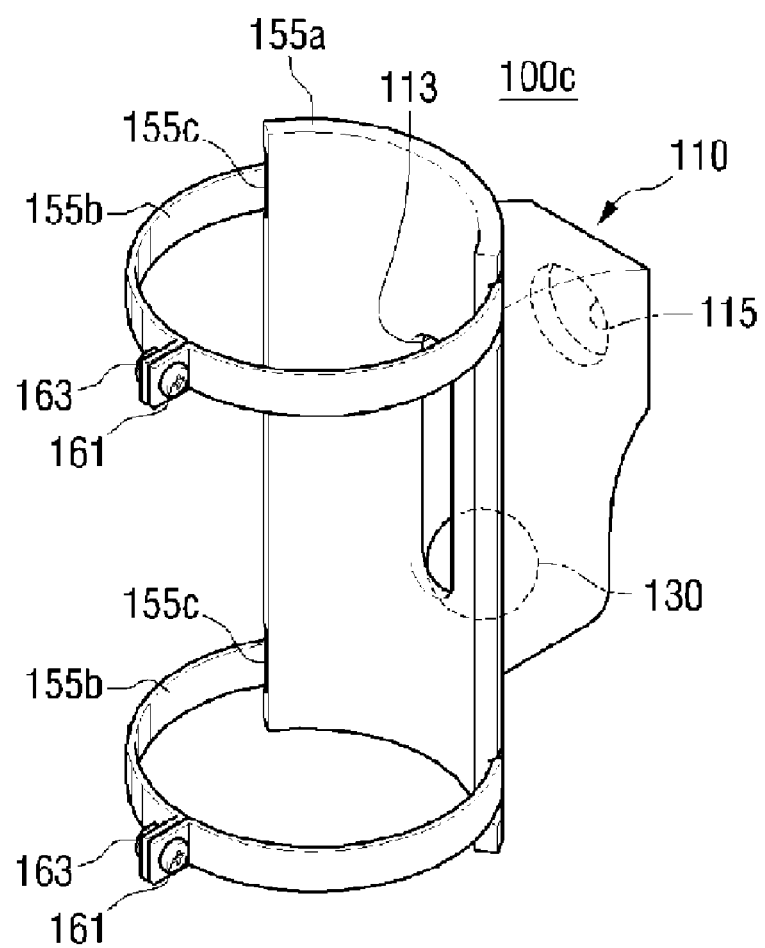
FIG. 48 is a perspective view showing an automatic gas intake and exhaust valve device according to a fourth embodiment of the present invention.

Hereinafter, an automatic gas intake and exhaust valve device 100c according to a fourth embodiment will be described with reference to FIGS. 48 to 50.

The automatic gas intake and exhaust valve device 100c according to the fourth embodiment has a structure and components identical to those of the automatic gas intake and exhaust valve device 100 according to the first embodiment except for coupling members 155a and 155b. Therefore, the structure and the components of the automatic gas intake and exhaust valve device 100c according to the fourth embodiment identical to those of the automatic gas intake and exhaust valve device 100 according to the first embodiment will not be further described.

Different from the coupling member 150 having the shape of a pipe according to the first to third embodiments, the coupling members 155a and 155b according to the fourth embodiment include the contact part 155a and a pair of the fastening bands 155b.

Figure 49:
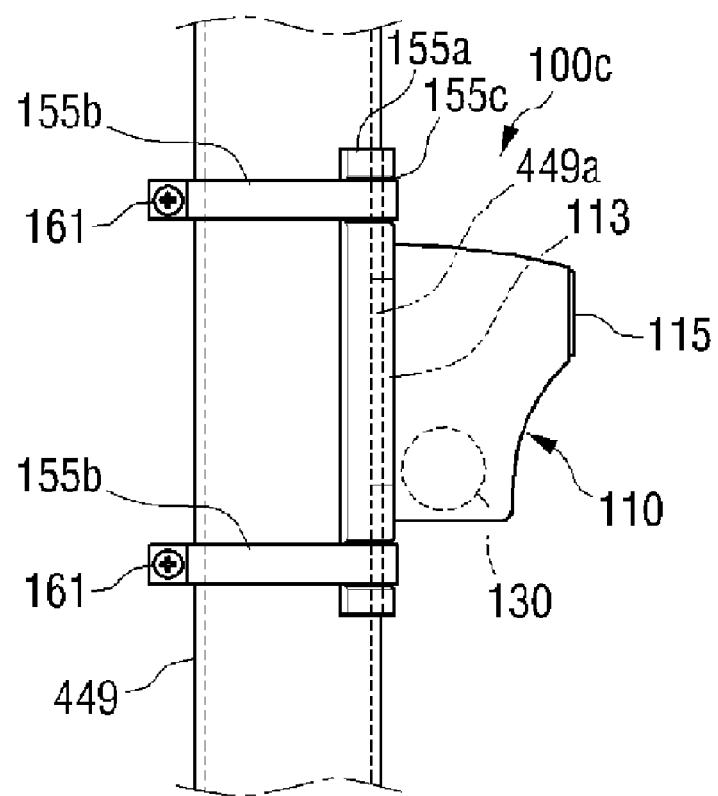
FIG. 49 is a schematic view showing the automatic gas intake and exhaust valve device according to the fourth embodiment of the present invention which is installed in a vertical pipe.

The contact part 155a extends along the peripheral portion of a side of the main body part 110 in which the orifice hole 113 is formed, and has a predetermined curvature so that the contact part 155a can closely make contact with the pipe 449 (see FIG. 49). In the state that portions of the fastening bands 155b are inserted into grooves 155c formed in outer surfaces of both ends of the contact part 155a, the fastening bands 155b fix the contact part 155a onto the pipe 449. The open ends of each of the fastening bands 155b are detachably coupled with each other by a fixing screw 161 and a nut 163.

After a through hole 449a has been formed in the pipe 449, which is conventionally installed, the automatic gas intake and exhaust valve device 100c according to the fourth embodiment is mounted on the pipe 449 so that the orifice hole 113 corresponds to the through hole 49a. Therefore, the automatic gas intake and exhaust valve device 100c according to the fourth embodiment can be mounted on the pipe without the restriction of the mounting positions, differently from the automatic gas intake and exhaust valve devices 100, 100a, and 100b according to the first to third embodiments.

Figure 50:
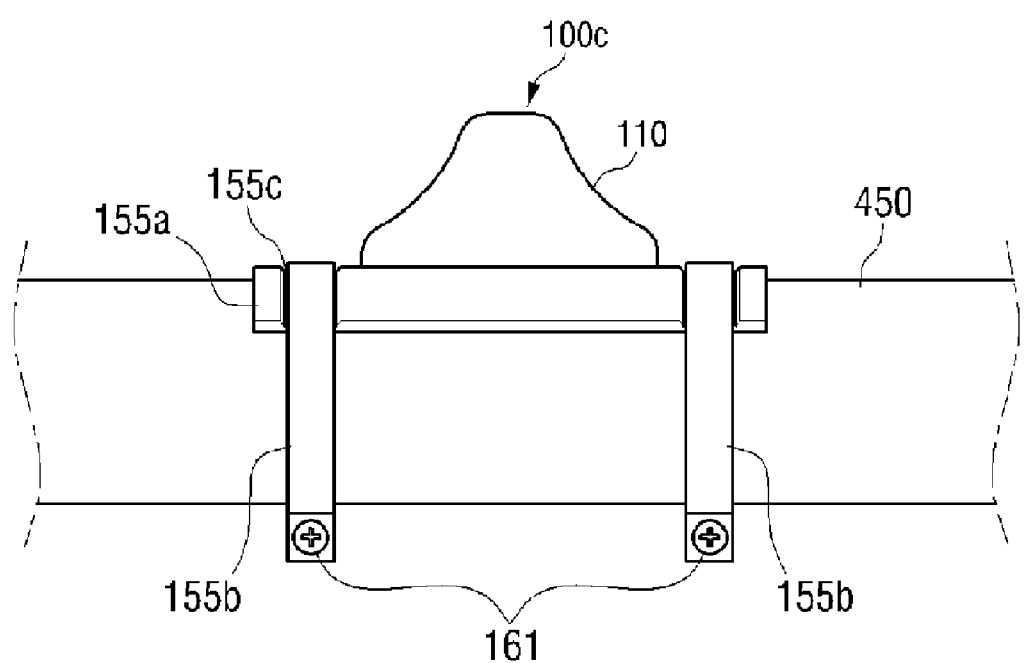
FIG. 50 is a schematic view showing the automatic gas intake and exhaust valve device according to the fourth embodiment of the present invention which is installed in a horizontal pipe.

In addition, as shown in FIG. 50, the automatic gas intake and exhaust valve device 100c according to the fourth embodiment may be mounted on the horizontally-arranged pipe 450 in addition to the vertical pipe 449. In this case, the main body part 110 is preferably manufactured in the same structure as that of the main body part 110 of the automatic gas intake and exhaust valve device 100b according to the third embodiment, both sides of which are symmetrical to each other, so that the opening/closing member 130 can be lifted regardless of the direction of a fluid flowing along the pipe 450.

Since the gas intake and exhaust operation of the automatic gas intake and exhaust valve device 100c according to the fourth embodiment is performed in the same manner as that of the first to third embodiments, the details of the operation of the fourth embodiment will be omitted.

Hereinafter, an automatic gas intake and exhaust valve device 100d according to a fifth embodiment will be described with reference to FIGS. 51 to 53.

The automatic gas intake and exhaust valve device 100d according to the fifth embodiment has a structure and components identical to those of the automatic gas intake and exhaust valve device 100 according to the first embodiment except for coupling members 156a and 156b. Therefore, the structure and the components of the automatic gas intake and exhaust valve device 100d according to the fifth embodiment identical to those of the automatic gas intake and exhaust valve device 100 according to the first embodiment will not be further described.

Figure 51:
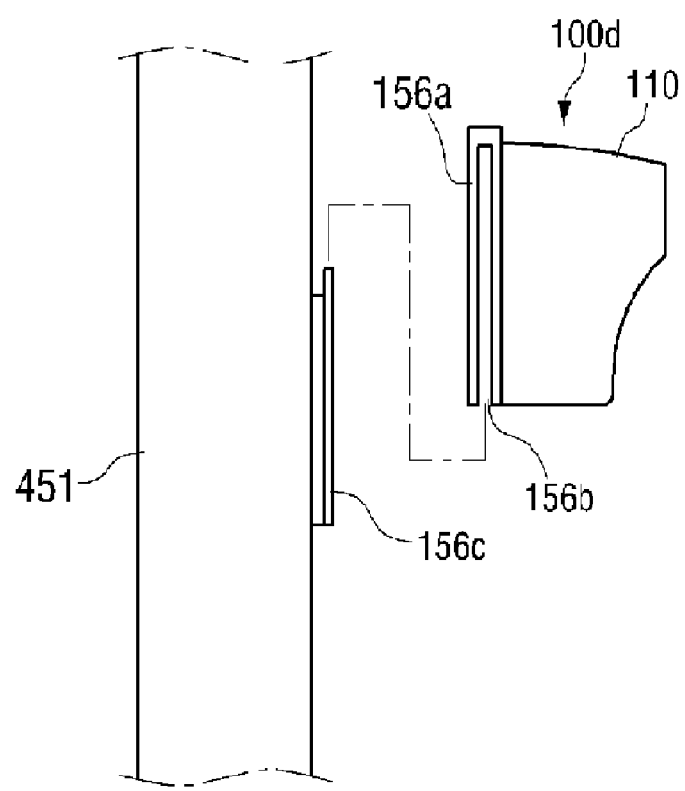
FIG. 51 is an exploded view showing an automatic gas intake and exhaust valve device according to a fifth embodiment of the present invention.
Figure 52:
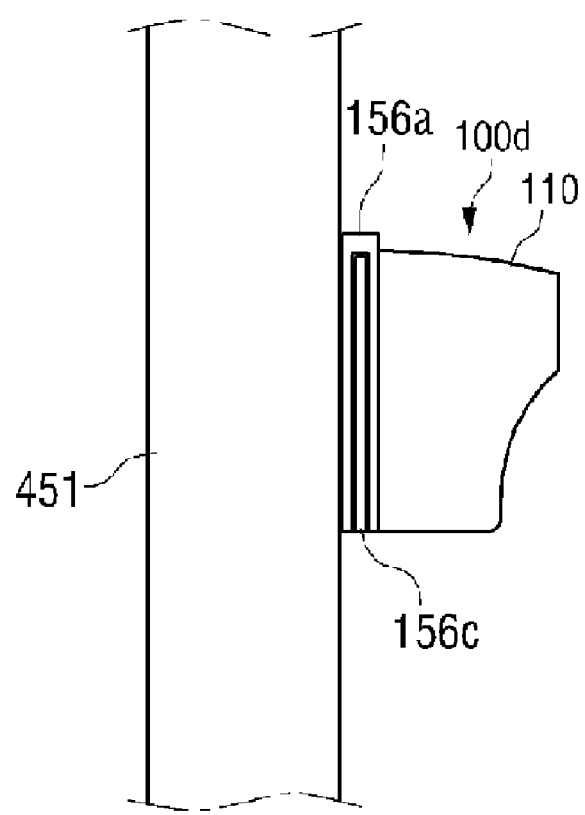
FIG. 52 is a schematic view showing the automatic gas intake and exhaust valve device according to the fifth embodiment of the present invention which is installed in a vertical pipe.

Referring to FIG. 51, the coupling members 156a and 156c include the first coupling part 156a provided at the rear portion of the main body part 110 and the second coupling part 156c formed at one side of the vertical pipe 451. In this case, by slidably inserting the second coupling part 156c into a slot 156b of the first coupling part 156a, the first and second coupling parts 156a and 156c are detachably coupled with each other.

Figure 53:
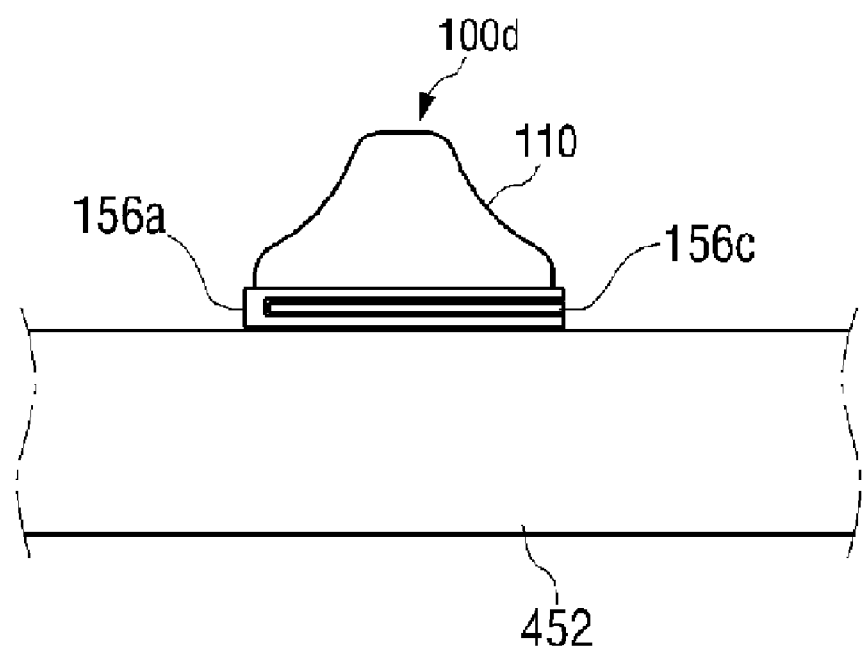
FIG. 53 is a schematic view showing the automatic gas intake and exhaust valve device according to the fifth embodiment of the present invention which is installed in a horizontal pipe.

As shown in FIG. 53, the automatic gas intake and exhaust valve device 100d according to the fifth embodiment may be mounted on the horizontally-arranged pipe 452 in addition to the vertical pipe 451. In this case, the main body part 110 is preferably manufactured in the same structure as that of the main body part 110 of the automatic gas intake and exhaust valve device 100b according to the third embodiment, both sides of which are symmetrical to each other, so that the opening/closing member 130 can be lifted regardless of the direction of a fluid flowing along the pipe 452.

Since the gas intake and exhaust operation of the automatic gas intake and exhaust valve device 100d according to the fifth embodiment is performed in the same manner as that of the first to third embodiments, the details of the operation of the fifth embodiment will be omitted.

Hereinafter, an automatic gas intake and exhaust valve device 100e according to a sixth embodiment will be described with reference to FIGS. 54 and 55. The automatic gas intake and exhaust valve device 100e according to the sixth embodiment has a structure and components identical to those of the automatic gas intake and exhaust valve device 100 according to the first embodiment except that the automatic gas intake and exhaust valve device 100e according to the sixth embodiment is coupled with a pipe through a welding scheme or by using an adhesive instead of the coupling member.

Figure 54:
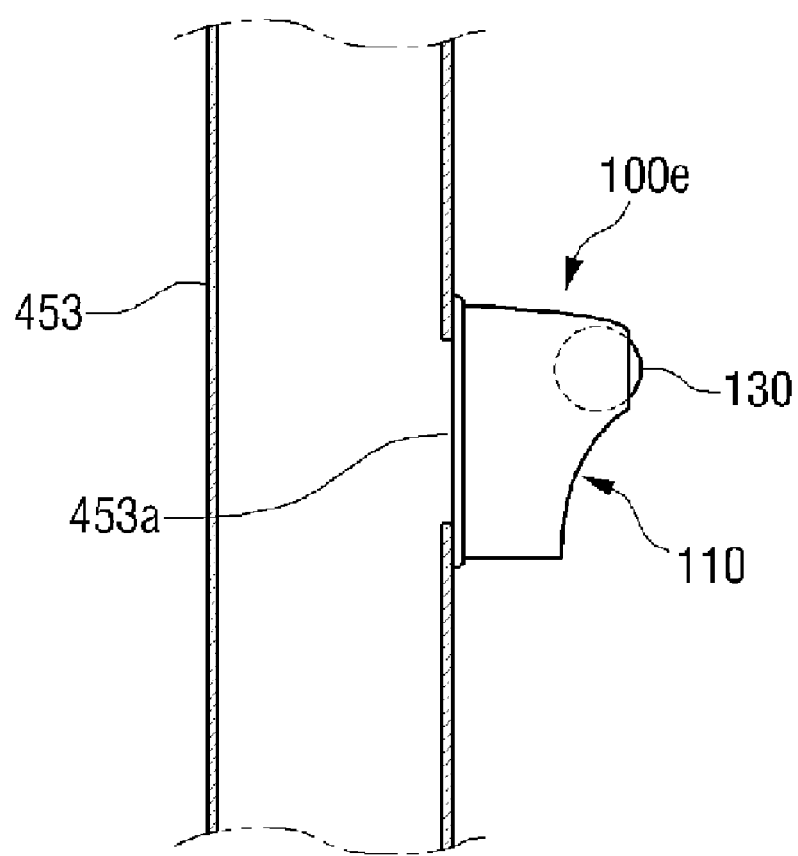
FIG. 54 is a schematic view showing an automatic gas intake and exhaust valve device according to a sixth embodiment of the present invention which is installed in a vertical pipe.

In other words, as shown in FIG. 54, in the automatic gas intake and exhaust valve device 100e according to the sixth embodiment, the main body part 110 is directly attached to the pipe 453 through the welding scheme or the adhesive such as a bond. In this case, an orifice hole 453a is previously formed in a portion of the pipe 453 before the main body part 110 is attached to the pipe 452. The orifice hole 453a having the shape of an elongated hole may be provided in the form of a pair of holes (see FIG. 11) or the shape of a peanut (see FIG. 12) as described in the first embodiment.

Figure 55:
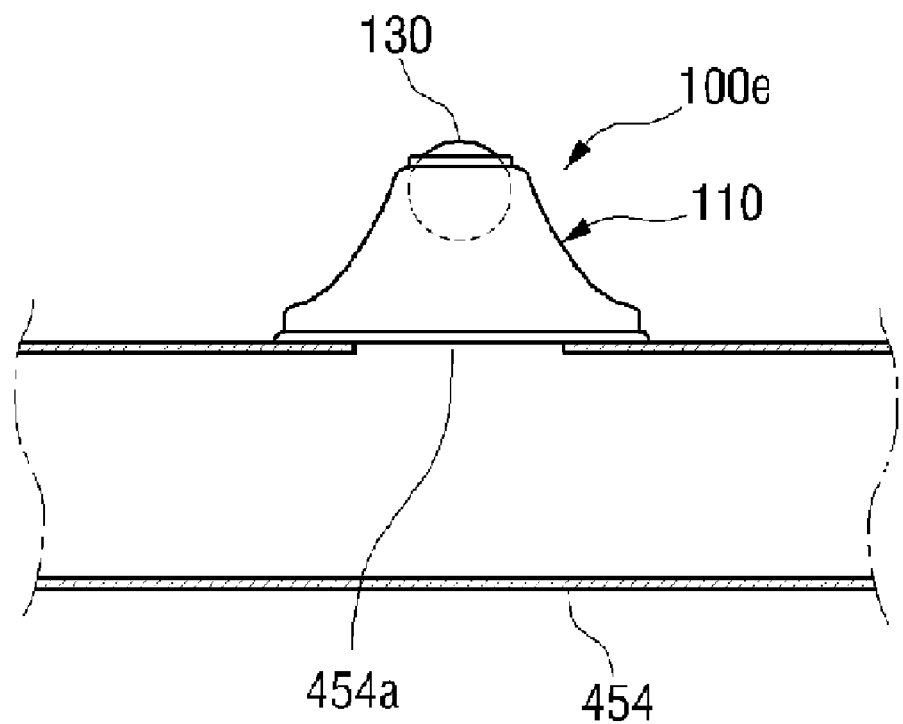
FIG. 55 is a schematic view showing the automatic gas intake and exhaust valve device according to the sixth embodiment of the present invention which is installed in a horizontal pipe.

AS shown in FIG. 55, the automatic gas intake and exhaust valve device 100e according to the sixth embodiment may be mounted on the horizontally-arranged pipe 454 in addition to the vertical pipe 453. In this case, the main body part 110 is preferably manufactured in the same structure as that of the main body part 110 of the automatic gas intake and exhaust valve device 100b according to the third embodiment, both sides of which are symmetrical to each other, so that the opening/closing member 130 can be lifted regardless of the direction of a fluid flowing along the pipe 454. In this case, the orifice hole 454a having the shape of an elongated hole may be provided in the form of a pair of holes (see FIG. 11) or the shape of a peanut (see FIG. 12) as described in the first embodiment.

Since the gas intake and exhaust operation of the automatic gas intake and exhaust valve device 100e according to the sixth embodiment is performed in the same manner as that of the first to third embodiments, the details of the operation of the sixth embodiment will be omitted.

The present invention is applicable to a general pump system or a pump system of a waste water discharging device.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An automatic gas intake and exhaust valve device comprising:
   a main body part and a chamber defined by the main body part and formed inside the main body part, wherein the main body part includes a bottom wall, a top wall, a left side wall and a right side wall, and the left side wall includes an orifice hole and the right side wall includes an intake and exhaust hole;
   an opening/closing member located and movable in the chamber of the main body part;
   a coupling member connected to the left side wall of the main body part and configured to connect the main body part with a pipe; and
   wherein the opening/closing member is in contact with the bottom wall when a fluid is not introduced into the chamber, is configured to float upwards towards the intake and exhaust hole according to a flow velocity of the fluid when the fluid is introduced into the chamber from the pipe, thereby closing the intake and exhaust hole,
   wherein the intake and exhaust hole is configured to discharge water and air until the intake and exhaust hole is closed by the floated opening/closing member, and
   wherein the automatic gas intake and exhaust valve is configured to completely discharge the air inside the pipe and main body party to the outside.

2. The automatic gas intake and exhaust valve device of claim 1, wherein a specific gravity of the opening/closing member is 1.0 to 9.0 times greater than a specific gravity of the fluid.

3. The automatic gas intake and exhaust valve device of claim 1, wherein the orifice hole has a width narrower than a diameter of the pipe.

4. The automatic gas intake and exhaust valve device of claim 1, wherein the orifice hole includes an elongated hole.

5. The automatic gas intake and exhaust valve device of claim 1, wherein the orifice hole includes a pair of holes spaced apart from each other by a predetermined distance, and at least one of the pair of holes is positioned corresponding to and in line with a position of the intake and exhaust hole.

6. The automatic gas intake and exhaust valve device of claim 1, wherein the opening/closing member has a spherical shape, and has a diameter greater than a width of the orifice hole.

7. The automatic gas intake and exhaust valve device of claim 1, wherein the coupling member has a pipe shape, and both of one side of the coupling member and an opposite side of the coupling member are open and connected to the pipe.

8. The automatic gas intake and exhaust valve device of claim 1, wherein the main body part is formed therein with a drawing hole for repair and maintenance work for the opening/closing member, and includes a plug for cleaning to open/close the drawing hole.

9. The automatic gas intake and exhaust valve device of claim 1, wherein the coupling member comprises:
   a first coupling part formed at a rear portion of the main body part; and
   a second coupling part formed at one side of the pipe, and
   wherein the first coupling part is detachably and slidably coupled with the second coupling part.

* * * * *